US012699342B2

(12) United States Patent
Toratani et al.

(10) Patent No.: US 12,699,342 B2
(45) Date of Patent: Aug. 4, 2026

(54) FIXING DEVICE

(71) Applicant: CANON KABUSHIKI KAISHA, Tokyo (JP)

(72) Inventors: Yasuharu Toratani, Chiba (JP); Akiyoshi Shinagawa, Saitama (JP); Hiroshi Miyamoto, Saitama (JP); Daigo Matsuura, Tokyo (JP); Hiroki Kawai, Chiba (JP); Ayano Ogata, Ibaraki (JP); Asuna Fukamachi, Chiba (JP); Masanobu Tanaka, Chiba (JP); Misa Kawashima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 19/018,341

(22) Filed: Jan. 13, 2025

(65) Prior Publication Data

US 2025/0147455 A1 May 8, 2025

Related U.S. Application Data

(63) Continuation of application No. 18/168,492, filed on Feb. 13, 2023, now Pat. No. 12,222,665.

(30) Foreign Application Priority Data

Feb. 28, 2022 (JP) ................................ 2022-028870

(51) Int. Cl.
*G03G 15/20* (2006.01)

(52) U.S. Cl.
CPC ..... *G03G 15/2053* (2013.01); *G03G 15/2064* (2013.01); *G03G 2215/2038* (2013.01)

(58) Field of Classification Search
CPC .......... G03G 15/2017; G03G 15/2053; G03G 15/2064; G03G 2215/2003
See application file for complete search history.

(56) References Cited

U.S. PATENT DOCUMENTS

| | | | | |
|---|---|---|---|---|
| 2006/0083567 | A1 | 4/2006 | Ito | |
| 2017/0097598 | A1 * | 4/2017 | Kudo | G03G 15/2053 |
| 2017/0176905 | A1 | 6/2017 | Suzuki | |
| 2018/0011435 | A1 * | 1/2018 | Tsubotani | G03G 15/2053 |
| 2020/0409292 | A1 * | 12/2020 | Fujimoto | G03G 15/2025 |

FOREIGN PATENT DOCUMENTS

| | | | |
|---|---|---|---|
| CN | 108463777 | A | 8/2018 |
| JP | 2010164808 | A | 7/2010 |
| JP | 2020052354 | A | 4/2020 |

* cited by examiner

*Primary Examiner* — Thomas S Giampaolo, II
(74) *Attorney, Agent, or Firm* — Canon U.S.A., Inc. IP Division

(57) ABSTRACT

A fixing device includes a fixing belt configured to heat a recording material, a pressure member configured to press the fixing belt, and a sliding member configured to be in sliding contact with an inner peripheral surface of the fixing belt and being opposed to the pressure member. The pressure member and the fixing belt form a fixing nip portion, and heat and pressure are applied to the recording material at the fixing nip portion to fix a toner image onto the recording material. The sliding member includes a plurality of protrusions on a surface of the sliding member that is in sliding contact with the inner peripheral surface of the fixing belt. The fixing belt satisfies the prescribed formulas.

8 Claims, 11 Drawing Sheets

FIG.11

CONDITIONS FOR VERIFICATION 1

| PARAMETER | VALUE | UNITS |
|---|---|---|
| Nx | 24.5 | mm |
| Ny | 326 | mm |
| NF | 1600 | N |
| P | 0.20 | MPa |
| E | 5000 | MPa |
| t | 0.08 | mm |

RESULTS OF VERIFICATION 1

| d [mm] | CALCULATED VALUE | | IMAGE RESULT | |
|---|---|---|---|---|
| | ΔP [MPa] | h [mm] | UNEVEN PEAK | UNEVEN HEIGHT |
| 0.2 | 0.00 | 0.00 | ○ | × |
| 0.9 | 0.02 | 0.01 | ○ | ○ |
| 1.4 | 0.04 | 0.05 | ○ | ○ |
| 1.8 | 0.06 | 0.13 | ○ | ○ |
| 2.1 | 0.09 | 0.24 | × | ○ |
| 2.5 | 0.13 | 0.48 | × | ○ |

CONDITIONS FOR VERIFICATION 2

| PARAMETER | VALUE | UNITS |
|---|---|---|
| Nx | 24.5 | mm |
| Ny | 326 | mm |
| NF | 1400 | N |
| P | 0.18 | MPa |
| E | 5000 | MPa |
| t | 0.08 | mm |

RESULTS OF VERIFICATION 2

| d [mm] | CALCULATED VALUE | | IMAGE RESULT | |
|---|---|---|---|---|
| | ΔP [MPa] | h [mm] | UNEVEN PEAK | UNEVEN HEIGHT |
| 0.2 | 0.00 | 0.00 | ○ | × |
| 0.9 | 0.01 | 0.01 | ○ | × |
| 1.4 | 0.03 | 0.04 | ○ | ○ |
| 1.8 | 0.06 | 0.11 | ○ | ○ |
| 2.1 | 0.08 | 0.21 | ○ | ○ |
| 2.5 | 0.11 | 0.42 | × | ○ |

CONDITIONS FOR VERIFICATION 3

| PARAMETER | VALUE | UNITS |
|---|---|---|
| Nx | 24.5 | mm |
| Ny | 326 | mm |
| NF | 1600 | N |
| P | 0.20 | MPa |
| E | 150000 | MPa |
| t | 0.04 | mm |

RESULTS OF VERIFICATION 3

| d [mm] | CALCULATED VALUE | | IMAGE RESULT | |
|---|---|---|---|---|
| | ΔP [MPa] | h [mm] | UNEVEN PEAK | UNEVEN HEIGHT |
| 0.2 | 0.00 | 0.00 | ○ | × |
| 0.9 | 0.02 | 0.00 | ○ | × |
| 1.4 | 0.04 | 0.01 | ○ | ○ |
| 1.8 | 0.06 | 0.03 | ○ | ○ |
| 2.1 | 0.09 | 0.06 | × | ○ |
| 2.5 | 0.13 | 0.13 | × | ○ |

FIXING DEVICE

CROSS-REFERENCE TO RELATED APPLICATIONS

The present application is a continuation of U.S. patent application Ser. No. 18/168,492, filed on Feb. 13, 2023, which claims priority from Japanese Patent Application No. 2022-028870 filed Feb. 28, 2022, which are hereby incorporated by reference herein in their entireties.

BACKGROUND OF THE INVENTION

Field of the Invention

The present invention relates to a fixing device that fixes a toner image onto a recording material.

Description of the Related Art

An image forming apparatus includes a fixing device that fixes an unfixed toner image formed on a recording material onto the recording material.

The fixing device includes an endless fixing belt, a heating rotary member that applies heat onto a fixing belt, and a pressure rotary member that presses the fixing belt to form a fixing nip portion with the fixing belt and is rotationally driven. The fixing nip portion is formed by a pressure applied between a fixing pad and a pressure roller through the fixing belt. When a recording material with an unfixed toner image formed thereon is conveyed to the fixing nip portion, the heat from the heating rotary member and the pressure exerted by the pressure rotary member are applied to the recording material, thereby fixing the toner image onto the recording material.

With the recent increase in the printing speed of image forming apparatuses, a fixing device having a structure with a wider width of a fixing nip portion in a recording material conveyance direction has been discussed. An increase in the width of the fixing nip portion is advantageous in achieving high-speed printing. However, this leads to an increase in sliding resistance between the fixing belt and the fixing pad.

In this regard, Japanese Patent Application Laid-Open No. 2020-52354 discusses a technique for reducing sliding resistance with respect to a fixing belt using a sliding member provided with a plurality of protrusions formed on a surface of the sliding member that is in contact with the fixing belt.

With the sliding member provided with the plurality of protrusions formed on the surface of the sliding member that is in contact with the fixing belt, a difference in pressure arises between the region with the protrusions and the region without the protrusions, as explained in relation to FIGS. 4A and 4B below. The pressure difference affects uneven glossiness of the fixed toner image. For this reason, it is desirable to reduce the pressure difference.

A technique for reducing the distance between the protrusions has been described below which helps reduce the pressure difference. However, another problem arises if there are differences in height between the protrusions and the distances between the protrusions are extremely small. In this case, the fixing belt does not fit the protrusions appropriately which in turn also leads to an increased pressure difference, as explained in relation to FIGS. 5A and 5B below. Thus, to prevent uneven glossiness, distances between the protrusions are set within a predetermined range.

SUMMARY OF THE INVENTION

The present invention is directed to providing a fixing device that prevents an increase in pressure difference in a fixing nip portion, reducing uneven glossiness on the surface of an image.

According to an aspect of the present invention, a fixing device includes a fixing belt configured to heat a recording material, a pressure member configured to press the fixing belt, and a sliding member configured to be in sliding contact with an inner peripheral surface of the fixing belt and being opposed to the pressure member. The pressure member and the fixing belt form a fixing nip portion, and heat and pressure are applied to the recording material at the fixing nip portion to fix a toner image onto the recording material. The sliding member includes a plurality of protrusions on a surface of the sliding member that is in sliding contact with the inner peripheral surface of the fixing belt, and the following expressions are satisfied:

$$3/2\pi \cdot d^2/a^2 \leq 0.08\ [\text{MPa}] \tag{1}$$

$$1 \leq 15.6 \times \frac{Pd^4}{Et^3}\ [\text{mm}] \tag{2}$$

where P [MPa] represents a pressure on the fixing nip portion, E [MPa] represents a Young's modulus of the fixing belt, t [mm] represents a thickness of the fixing belt, d [mm] represents a distance between the plurality of protrusions in a sheet width direction of the recording material and $a^2$ [$mm^2$] where the plurality of protrusions in the area $d^2$ contact the fixing belt.

Further features of the present invention will become apparent from the following description of embodiments with reference to the attached drawings.

BRIEF DESCRIPTION OF THE DRAWINGS

FIG. 11 illustrates tables indicating results of verifications 1 to 3.

DESCRIPTION OF THE EMBODIMENTS

An image forming apparatus according to an embodiment of the present invention will be described below with reference to the drawings. While the following embodiments illustrate an example where the present invention is applied to an electrophotographic full-color image forming apparatus including a plurality of photosensitive drums, the present invention is not limited to this example. The present invention can also be applied to a monochrome image forming apparatus and the like.

<Image Forming Apparatus>

A schematic configuration of an image forming apparatus 1 according to an embodiment of the present invention will now be described with reference to FIG. 1.

Figure 1:
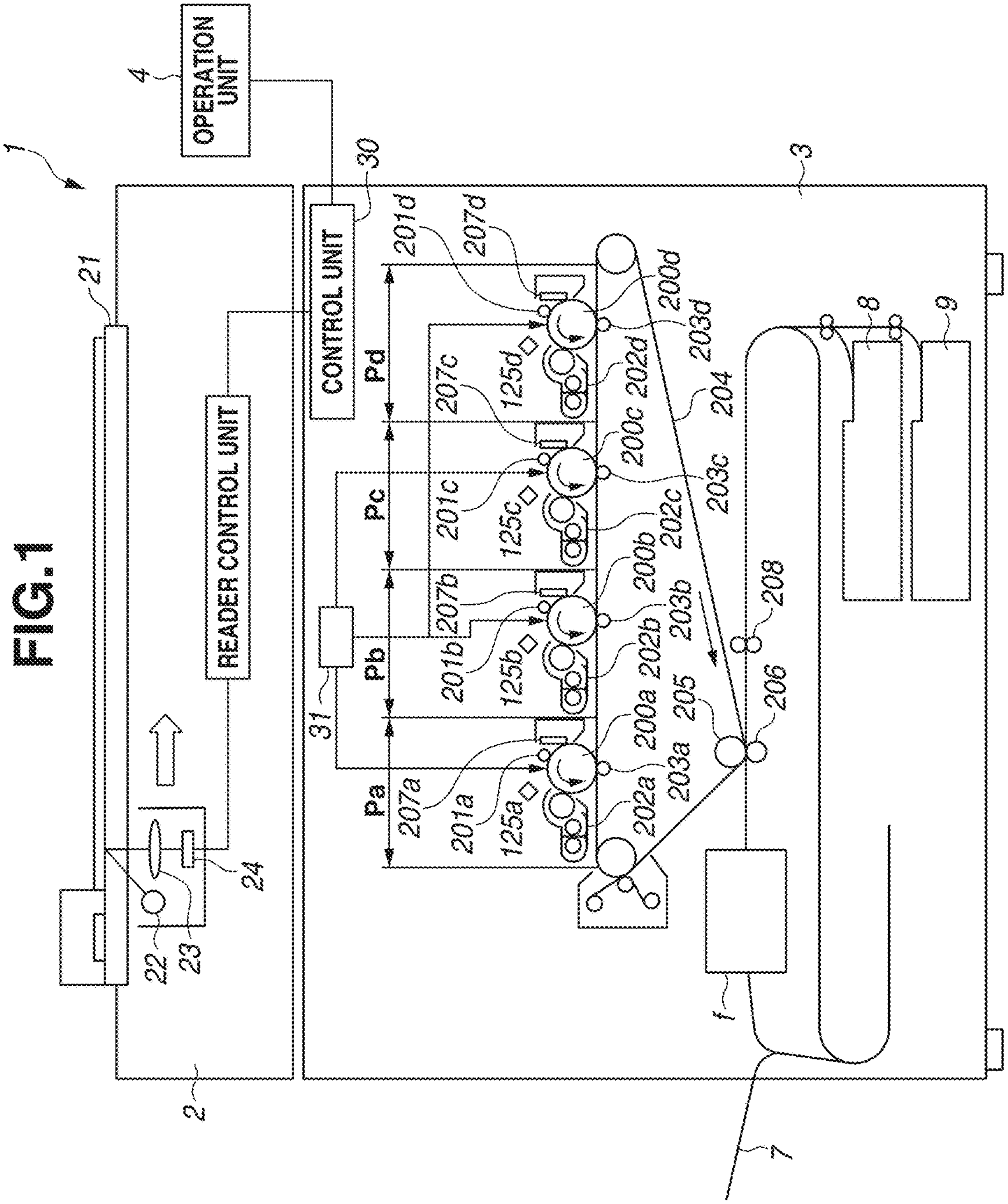
FIG. 1 is a schematic view illustrating an image forming apparatus according to an embodiment of the present invention.

FIG. 1 is a schematic view illustrating a full-color image forming apparatus according to the present embodiment. An image forming apparatus 1 includes an image reading unit 2 and an image forming apparatus body 3. The image reading unit 2 reads a document placed on a platen glass 21. Light emitted from a light source 22 is reflected by the document and is focused on a charge-coupled device (CCD) sensor 24 through an optical system member 23 such as a lens. Such an optical system unit scans the document in the direction indicated by an open arrow illustrated in FIG. 1, thereby converting scanned data on the document into an electric signal data sequence for each line. An image signal obtained by the CCD sensor 24 is transmitted to the image forming apparatus body 3. A control unit 30 performs image processing on the image signal depending on each image forming unit to be described below. The control unit 30 also receives external inputs from an external host apparatus (operation unit 4), such as a print server, as image signals.

The image forming apparatus body 3 is provided with four types of image forming units, i.e., a yellow image forming unit Pa, a magenta image forming unit Pb, a cyan image forming unit Pc, and a black image forming unit Pd, along a movement direction of an intermediate transfer belt 204. First, a process in which a toner image is formed on the intermediate transfer belt 204 will be described using the yellow image forming unit Pa by way of example.

As illustrated in FIG. 1, a charging device 201*a* uniformly charges the surface of a photosensitive drum 200*a* that is rotationally driven (charging). After that, an exposure device 31 emits laser light on the surface of the photosensitive drum 200*a* based on input image data and forms an electrostatic latent image on the surface of the photosensitive drum 200*a* (exposure). After that, a developing device 202*a* forms a yellow toner image on the surface of the photosensitive drum 200*a*. A primary transfer roller 203*a* applies a voltage with the polarity opposite to that of the yellow toner image to the intermediate transfer belt 204. Thus, the yellow toner image formed on the surface of the photosensitive drum 200*a* is transferred onto the intermediate transfer belt 204 (primary transfer). Yellow toner that has not been transferred and remains on the surface of the photosensitive drum 200*a* is scraped off by a toner cleaner 207*a* and removed from the surface of the photosensitive drum 200*a*. The above-described series of processes are also performed on the magenta image forming unit Pb, the cyan image forming unit Pc, and the black image forming unit Pd. As a result, a full-color toner image is formed on the intermediate transfer belt 204.

The toner image formed on the intermediate transfer belt 204 is conveyed to a secondary transfer portion formed by a pair of secondary transfer rollers 205 and 206. In synchronization with the timing of conveying the toner image, recording materials are taken out one by one from recording material cassettes 8 and 9 and are fed to the secondary transfer portion. Then, the toner image formed on the intermediate transfer belt 204 is transferred onto each recording material (secondary transfer).

The recording material onto which the toner image is transferred is conveyed to a fixing device f. The fixing device f applies heat and pressure to the recording material to thereby fix the toner image onto the recording material (fixation). The recording material with the toner image fixed thereon is discharged onto a discharge tray 7.

The image forming apparatus 1 can also perform black-and-white image formation. During the black-and-white image formation, only the black image forming unit Pd among the plurality of image forming units is driven.

In a duplex image formation on the recording material, after the completion of transfer and fixation of a toner image onto an image forming first surface (first surface), the front and back surfaces of the recording material are reversed through a reverse portion provided in the image forming apparatus 1 after the fixation. Next, the toner image is transferred and fixed onto an image forming second surface (second surface), and the recording material is discharged to the outside of the image forming apparatus 1 and is stacked on the discharge tray 7.

The series of processes from the charging process to the process of discharging the recording material with the toner image fixed thereon to the discharge tray 7 are part of the image forming processing steps (print job). A period during which image forming processing steps are performed is referred to as an image forming processing period (print job period).

<Fixing Device>

Figure 2:
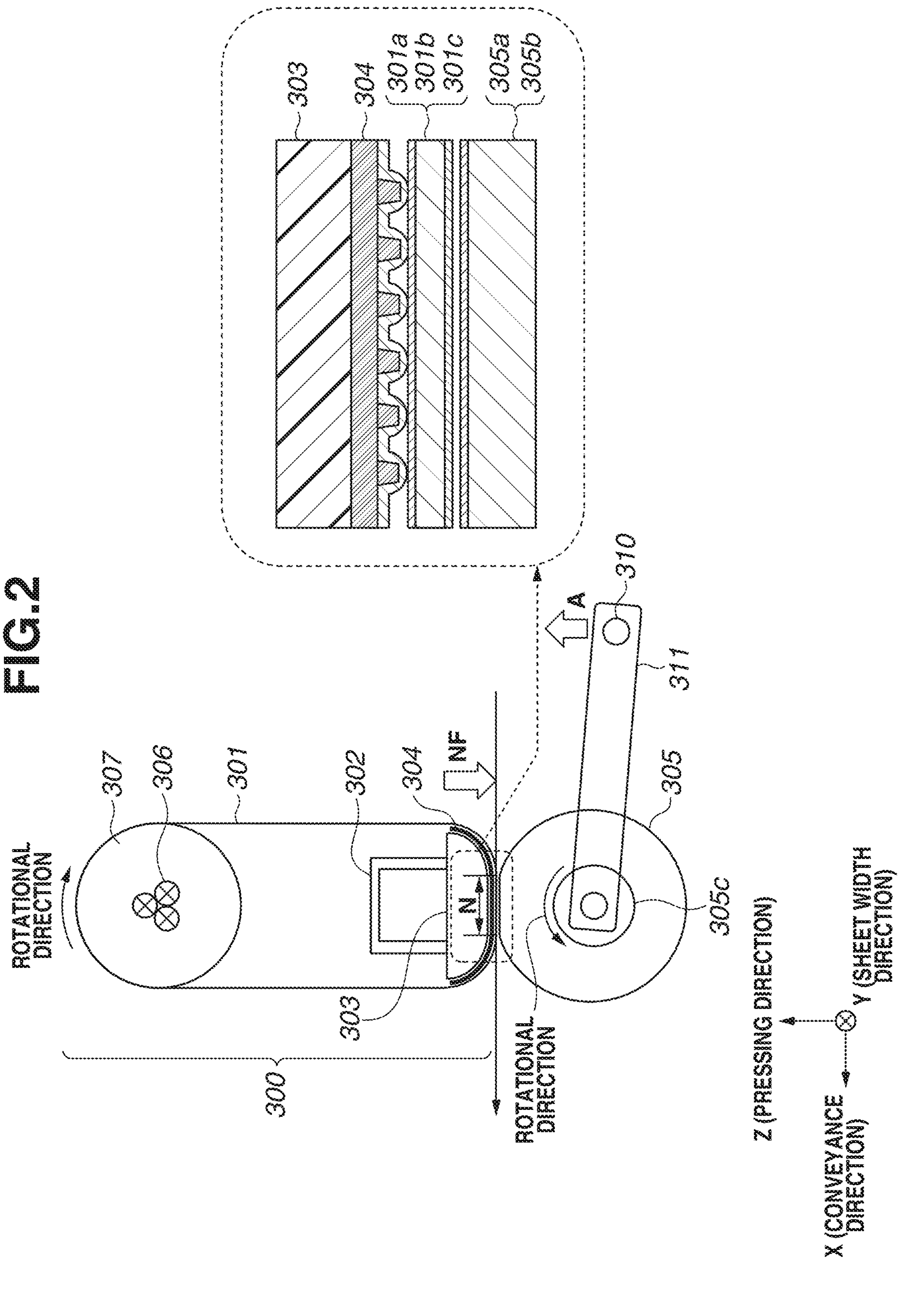
FIG. 2 is a schematic sectional view of a fixing device according to the embodiment.

FIG. 2 is a schematic view illustrating the overall structure of the fixing device f of a belt heating type according to the present embodiment. In FIG. 2, an X-direction indicates the conveyance direction of the recording material, a Y-direction indicates the sheet width direction, and a Z-direction indicates a pressing direction. The pressing direction is a direction in which a contacting/separating mechanism to be described below brings a pressure roller 305 into contact with a fixing belt. A dotted-line area illustrated in FIG. 2 represents an enlarged sectional view of a fixing nip portion N.

The fixing device f includes a fixing belt (hereinafter simply referred to as a belt) 301 serving as an endless rotatable heating rotary member, a pad member (hereinafter simply referred to as a pad) 303 that supports a fixing member, and a stay 302 that supports the pad 303. The fixing device f also includes a sliding member 304 that is provided covering the pad 303, a heating roller 307, and a pressure roller 305 serving as a pressure rotary member opposed to the belt 301. The pressure roller 305 and the belt 301 form the fixing nip portion N.

The belt 301 has thermal conductivity, heat resistance, and other properties, and has a thin cylindrical shape. In the present embodiment, the belt 301 has a three-layer structure including a base layer 301*a*, an elastic layer 301*b* formed over the outer periphery of the base layer 301*a*, and a mold release layer 301*c* formed over the outer periphery of the elastic layer 301*b*. The base layer 301*a* has a thickness of 80 μm and is made of polyimide (PI) resin. The elastic layer 301*b* is silicone rubber with a thickness of 300 μm. The mold release layer 301*c* is formed using tetrafluoroethylene-perfluoroalkyl vinyl ether copolymer (PFA) resin as fluororesin with a thickness of 30 μm. The belt 301 is suspended between the heating roller 307 and the pad 303 arranged on the inner peripheral surface of the belt 301. In the present embodiment, the outer diameter of the belt 301 is 150 mm.

The pad 303 is pressed against the pressure roller 305 through the belt 301, thereby forming the fixing nip portion N. The pad 303 is formed using liquid crystal polymer (LCP) resin. The sliding member 304 is interposed between the pad 303 and the belt 301.

In the fixing device f according to the present embodiment, a pressure of 1600 N is applied to the fixing nip portion N and the fixing nip portion N has a width of 24.5 mm. Thus, sliding resistance with respect to the pad 303 that allows the belt 301 to be suspended is large. To reduce the sliding resistance, the sliding member 304 that is in slidable contact with the belt 301 is provided on the side of the pad 303 that is in contact with the belt 301. This structure will be described in detail below.

Figure 3A:
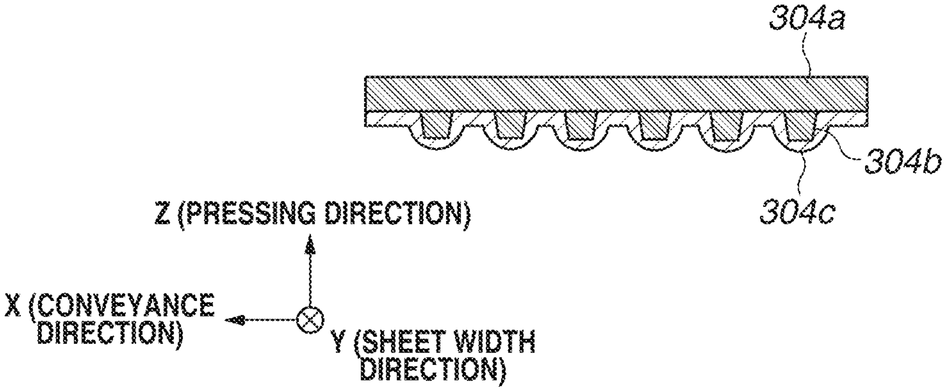
FIGS. 3A and 3B are detailed views of a sliding member.
Figure 3B:
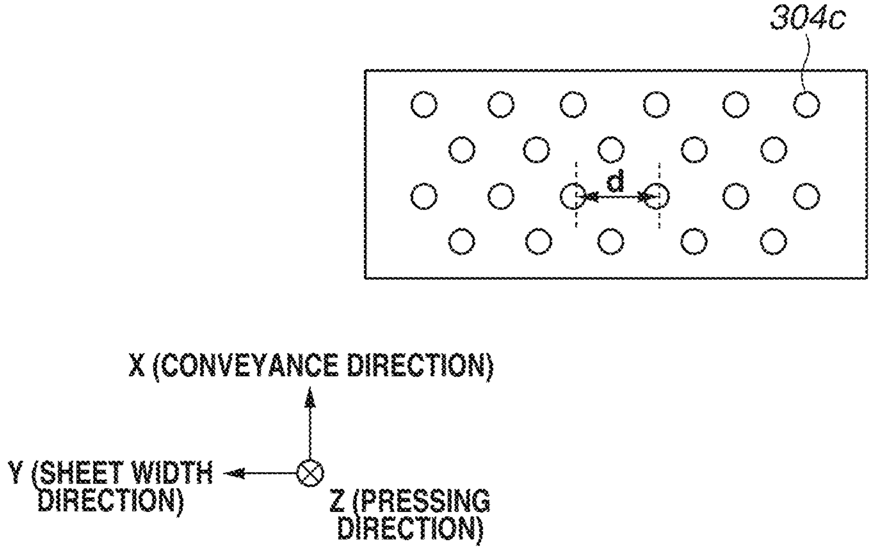

FIGS. 3A and 3B each illustrate a detailed structure of the sliding member 304. FIG. 3A is a sectional view of the sliding member 304 when the right-left direction in FIG. 3A corresponds to the conveyance direction (X-direction) and the up-down direction in FIG. 3A corresponds to the pressing direction (Z-direction). FIG. 3B is a schematic view of the sliding member 304 as viewed from the pressure roller 305 when the right-left direction in FIG. 3B corresponds to the sheet width direction (Y-direction) and the up-down direction in FIG. 3B corresponds to the conveyance direction (X-direction). As illustrated in FIG. 3A, the sliding member 304 according to the present embodiment includes a base material portion 304*a*, embossed portions 304*b* as protrusions, and a sliding layer 304*c*. It is suitable that the base material portion 304*a* have sufficient heat resistance and sufficient strength. The base material portion 304*a* is desirably made of stainless steel (SUS), copper, aluminum, engineering plastic (PI, polyetheretherketone (PEEK), LCP, etc.), or the like. In the present embodiment, the sliding member 304 is provided with the embossed portions 304*b* that are arranged at regular intervals in the sheet width direction, specifically, at a distance d between the embossed portions 304*b* (distance between protrusions) of 1.4 mm. The formation of the embossed portions 304*b* makes it possible to reduce the area in contact with the belt 301, which leads to a reduction in sliding resistance. A method for measuring the distance d between the embossed portions 304*b* will be described below. In the present embodiment, the base material portion 304*a* and the embossed portions 304*b* are formed of metal such as SUS. The material of the base material portion 304*a* and the embossed portions 304*b* is not limited to SUS. Any metallic material excellent in heat resistance and durability is desirably used.

The sliding layer 304*c* is desirably provided with a material (fluororesin, polytetrafluoroethylene (PTFE), PFA, etc.) to achieve a lower friction. In the present embodiment, the sliding layer 304*c* is coated with PTFE with a thickness 20 μm. A frictional force generated between the sliding member 304 and the inner peripheral surface of the belt 301 is extremely large. For this reason, lubricant is additionally applied to the belt 301, thereby enabling the belt 301 to smoothly slide with respect to the sliding member 304. Silicone oil is used as the lubricant. Forming the fixing nip portion N involves reinforcing the pad 303. For this reason, the stay 302 is provided.

The sliding member 304 according to the present embodiment is formed covering the pad 303 on the inside and outside of the fixing nip portion N. Although not illustrated in the figure, a part of the fixing nip portion N may be covered with the sliding member 304. In other words, the sliding member 304 may be disposed on the fixing nip portion N alone.

In the present embodiment, the embossed portions 304*b* of the sliding member 304 is formed on the entire area of the sliding member 304. Although not illustrated in the figure, it is suitable that a part of the fixing nip portion N is covered with the embossed portions 304*b* of the sliding member 304. In other words, the embossed portions 304*b* of the sliding member 304 may be arranged on the fixing nip portion N alone.

In the present embodiment, the sliding member 304 is configured to be fixed to the stay 302. Although not illustrated in the figure, the sliding member 304 and the pad 303 may be integrally formed. A part of the sliding member 304 may be fixed to the stay 302 and the pad 303.

For example, both end portions of the sliding member 304 in the Y-direction (sheet width direction) may be fixed to the pad 303 with screws or the like.

The heating roller 307 is a stainless pipe with a thickness of 1 mm. A plurality of halogen heaters 306 are provided as a heating source in the heating roller 307. The heating roller 307 can be heated to a predetermined temperature. In the present embodiment, the heating roller 307 includes the plurality of halogen heaters 306 with different orientation distributions in the sheet width direction. With this structure, a heating region can be varied depending on the size of the recording material, which is advantageous in preventing a considerable increase in the temperature at each edge of a sheet when small-size sheets are continuously fed. The heating roller 307 is provided on the inner periphery of the belt 301 and suspends the belt 301. The heating roller 307 is in contact with the belt 301 to transfer heat to the belt 301. The heating roller 307 is formed of a metallic pipe such as a stainless pipe. Thus, the heating roller 307 formed of a metallic roller has a better thermal conductivity than that of a roller including a rubber layer, which enables the heat from the halogen heater 306 to be rapidly transferred to the surface of the heating roller 307.

The heating roller 307 has a rotation center at one end or in the vicinity of the center thereof and rotates with respect to the belt 301, thereby generating a difference in tension. This enables steering control for controlling the position of the belt 301 in the width direction. Another member capable of performing steering control may be additionally provided. Specifically, three members, i.e., the heating roller 307, the pad 303, and a steering roller, may be used to suspend the belt 301.

The heating roller 307 also functions as a tension roller that is biased by a spring supported by a frame of a heating unit 300 and applies a predetermined tensile force to the belt 301.

The pressure roller 305 is a roller including a core bar layer 305*c*, an elastic layer 305*b* arranged on the outer periphery of a shaft, and a mold release layer 305*a* arranged on the outer periphery of the elastic layer 305*b*. A SUS member with a diameter of 72 mm is used for the shaft. Conductive silicone rubber with a thickness of 8 mm is used for the elastic layer 305*b*. PFA that is a fluororesin is used for the mold release layer 305*a* and the mold release layer 305*a* is formed with a thickness of 100 μm. Both ends of the pressure roller 305 in the sheet width direction are supported by a fixing frame (not illustrated) of the fixing device f. A gear is fixed to one end of the pressure roller 305, and the pressure roller 305 is rotationally driven by a drive source (not illustrated) to which the pressure roller 305 is connected through the gear.

The pressure roller 305 is rotationally driven while the fixing nip portion N is formed. Then, the belt 301 is driven and rotated by the pressure roller 305. The heating roller 307 also rotationally drives and rotates the belt 301. The toner image formed on the recording material is heated while the recording material carrying the toner image is nipped and conveyed in the fixing nip portion N formed between the belt 301 and the pressure roller 305. Thus, the fixing device f fixes the toner image onto the recording material while nipping and conveying the recording material. In the present embodiment, the pressure to be applied to the fixing nip portion N is set to 1600 N, the width of the fixing nip portion N in the X-direction (conveyance direction) is set to 24.5 mm, and the width of the fixing nip portion N in the Y-direction (sheet width direction) is set to 326 mm.

<Contacting/Separating Mechanism>

The contacting/separating mechanism of the pressure roller 305 will now be described. The contacting/separating mechanism enables the pressure roller 305 to move to a contact position where the pressure roller 305 contacts the belt 301, or to a separate position where the pressure roller 305 is separated from the belt 301. The contacting/separating mechanism includes a frame 311 and a drive motor. The frame 311 supports the pressure roller 305. The frame 311 receives a driving force from the drive motor and rotates about a rotation axis 310. When the drive motor drives the frame 311 to be rotated clockwise in the figure about the rotation axis 310, the pressure roller 305 moves in the direction indicated by an arrow A. This brings the pressure roller 305 into contact with the pad 303 through the belt 301 in the direction perpendicular to the conveyance direction of the recording material, that is, in the pressing direction (contact state). Thus, the fixing nip portion N is formed. When the frame 311 is rotated counterclockwise in the figure about the rotation axis 310, the pressure roller 305 is separated from the belt 301 (separated state).

As described above, the fixing nip portion N nips and conveys the recording material carrying an unfixed toner image and applies heat and pressure to the recording material to thereby fix the toner image onto the recording material.

<Formation of Embossed Portions on Sliding Member>

The structure in which the sliding member 304 is provided with the sliding layer 304*c* and lubricant reduces deterioration due to friction. However, since the fixing nip portion N has the width of 24.5 mm and the pressure of 1600 N is applied to the fixing nip portion N in the present embodiment, the frictional force between the belt 301 and the sliding member 304 at the fixing nip portion Nis large. This can wear the inner peripheral surface of the belt 301 and the sliding member 304 severely. For this reason, the sliding member 304 is provided with the plurality of embossed portions 304*b* as protrusions. The formation of the plurality of embossed portions 304*b* makes it possible to reduce the contact area between the belt 301 and the sliding member 304, reducing the frictional force. Consequently, this prevents the belt 301 and the sliding member 304 from being worn, achieving a longer lifetime.

<Factors for Causing Uneven Pressure Due to Embossed Portions>

As described above, the sliding member 304 is provided with the plurality of embossed portions 304*b*. This leads to an increase in the difference between a peak pressure on a region where the embossed portions 304*b* are provided and a pressure on a region where the embossed portions 304*b* are not provided in the sheet width direction (Y-direction). Such an uneven pressure within the fixing nip portion N is dependent on the distance d between the embossed portions 304*b*. The uneven pressure affects uneven glossiness of the fixed toner image. Thus, it is desirable to minimize the uneven pressure. To minimize the uneven pressure, a technique for reducing the distance d between the embossed portions 304*b* has been described below.

However, in addition to the above, if there is a difference in height between the embossed portions 304*b* and the distance between the embossed portions 304*b* is extremely small, the belt 301 cannot fit the embossed portions 304*b* appropriately. This in turn can also lead to an increase in uneven pressure. To reduce uneven glossiness, it is desirable to set the distance d between the embossed portions 304*b* within a predetermined range.

The uneven pressure that is an issue to be solved by the present invention will now be described in detail below.

The uneven pressure caused when the sliding member 304 is provided with the plurality of embossed portions 304*b* will be described with reference to FIGS. 4A and 4B and FIGS. 5A and 5B. The fixing nip portion N according to the present embodiment is a wide nip with a width of 24.5 mm. As a result of studying the structure of the wide nip, it has been determined that two different types of uneven pressure are generated on the fixing nip portion N, creating a defective image when a sheet is fed. These uneven pressures are caused by the embossed portions 304*b* of the sliding member 304.

Figure 4B:
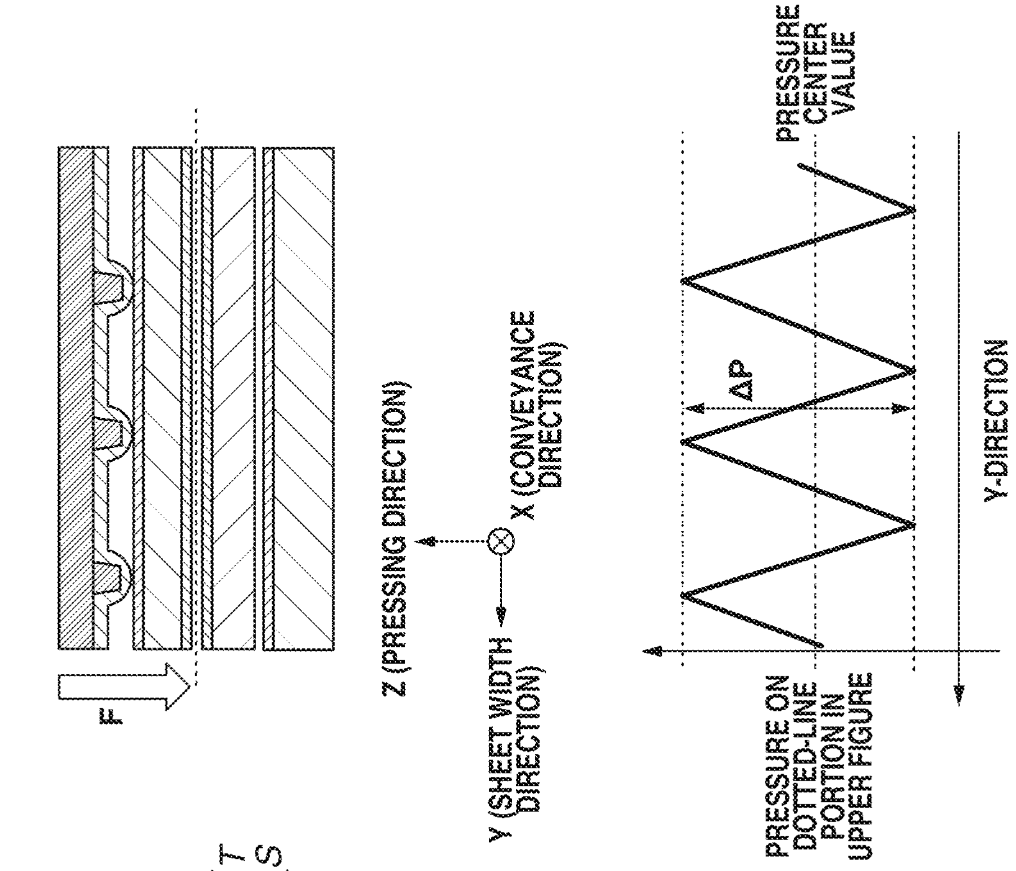
FIGS. 4A and 4B each illustrate a schematic view of the fixing device and a pressure distribution on the surface of a toner image to describe a peak pressure.
Figure 4A:
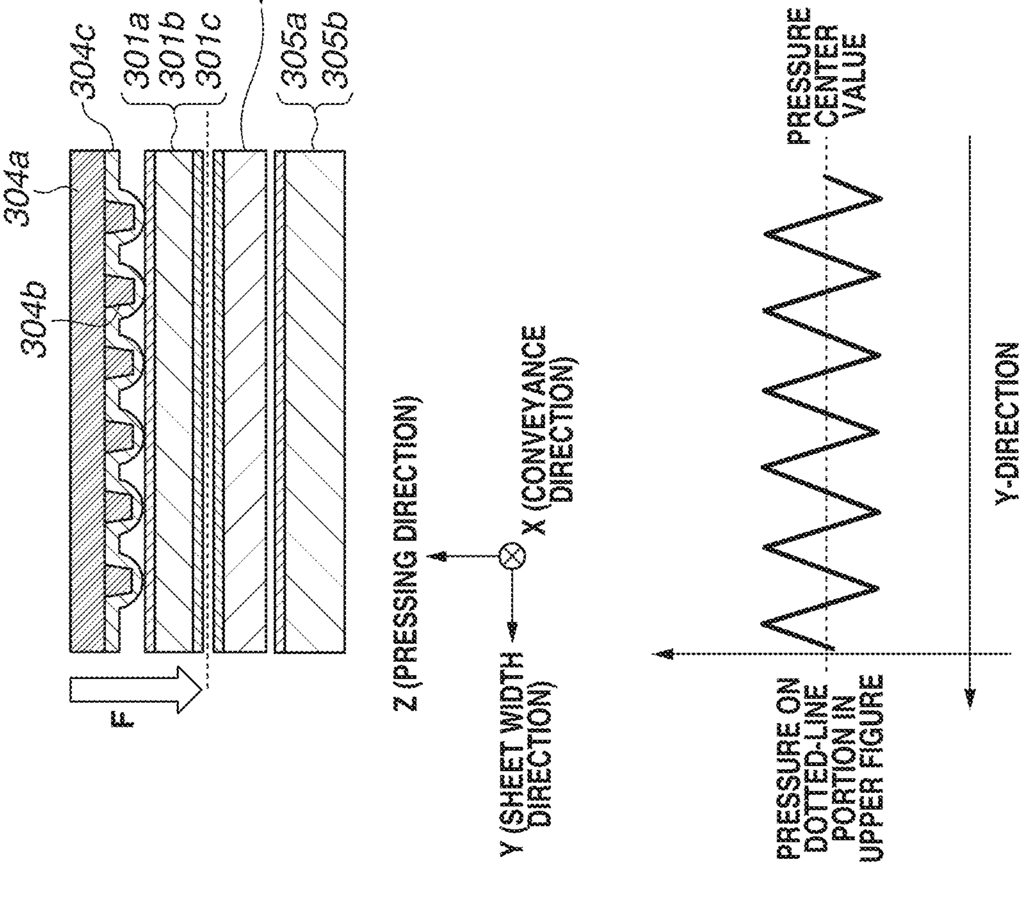

A first type of uneven pressure is an uneven pressure (hereinafter referred to as an uneven peak) that is generated due to a high pressure at the end of each of the embossed portions 304*b* of the sliding member 304 as illustrated in FIGS. 4A and 4B.

Figure 5A:
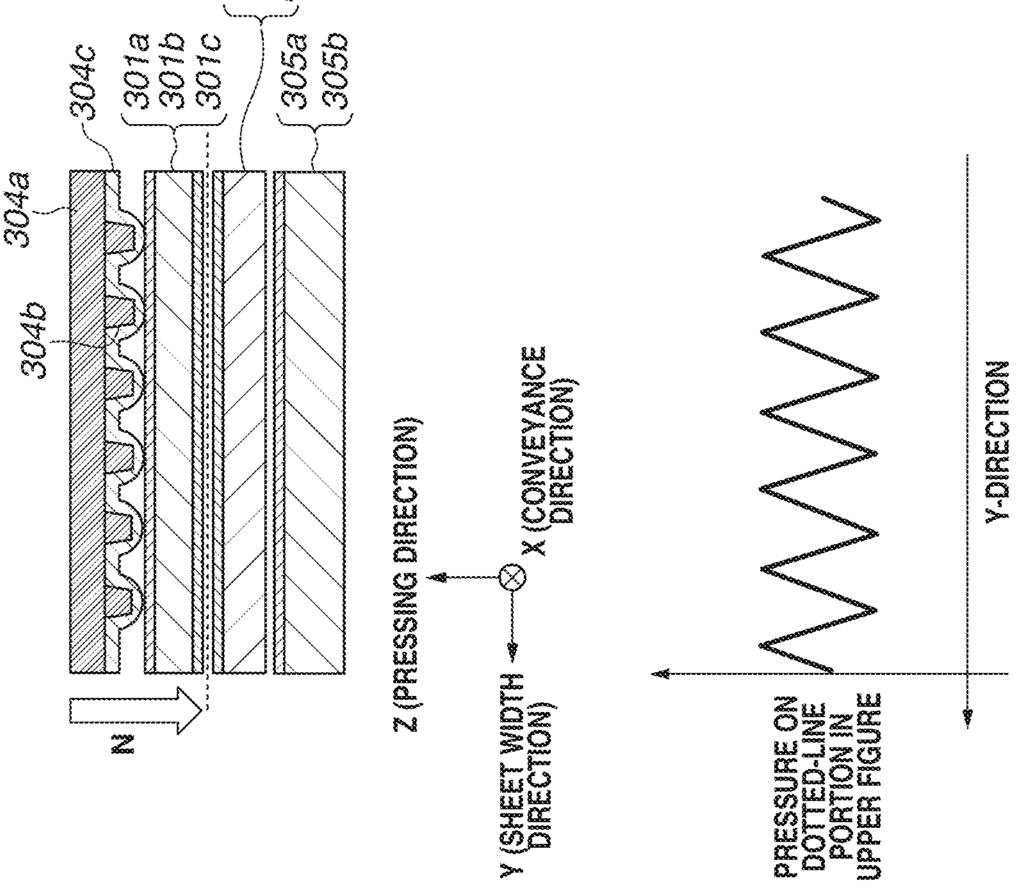
FIGS. 5A and 5B each illustrate a schematic view of the fixing device and a pressure distribution of the surface of a toner image to describe a height uneven pressure.
Figure 5B:
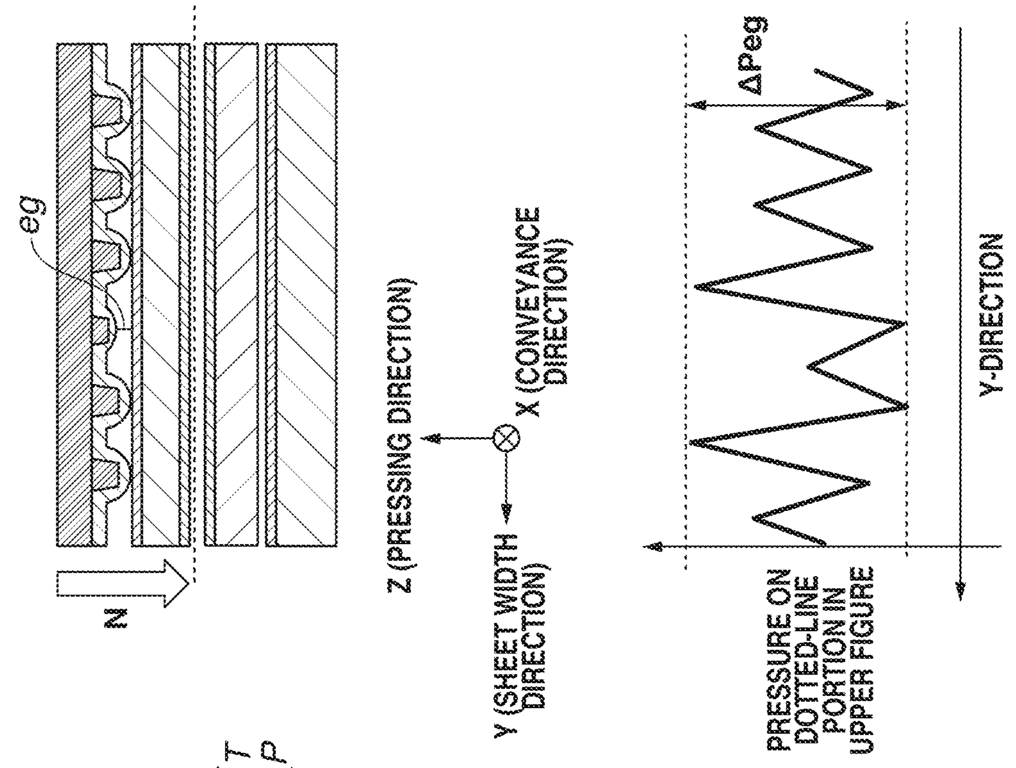

A second type of uneven pressure is an uneven pressure (hereinafter referred to as a height uneven pressure) that is generated due to a difference in height between the adjacent embossed portions 304*b* of the sliding member 304 as illustrated in FIGS. 5A and 5B. The above-described two factors for causing the uneven pressure and verification expressions based on which the present invention has been devised will now be described in detail below.

The "uneven peak" will be described with reference to FIGS. 4A and 4B. FIGS. 4A and 4B each illustrate a schematic view of the fixing device f in a state where the recording material carrying a toner image T is pressed and conveyed by the fixing nip portion N in the fixing device f, and also illustrate a pressure distribution on the surface of the toner image T (corresponding to the dotted-line portion in the upper figures). The recording material is heated and pressed through the sliding member 304, the belt 301, and the pressure roller 305 so that the toner image T is fixed onto the recording material. FIG. 4A illustrates a schematic view of the fixing device f according to the present embodiment using the embossed portions 304*b* of the sliding member 304, and also illustrates a pressure distribution on the surface of the toner image T at the dotted-line portion. FIG. 4B illustrates a schematic view of the sliding member 304 in which the distance d between the embossed portions 304*b* is twice as long as the distance d illustrated in FIG. 4A, and also illustrates a pressure distribution on the surface of the toner image T at the dotted-line portion. The pressure distribution on the surface of the recording material is dependent on the shape of each of the embossed portions 304*b* of the sliding member 304 and the distance d between the embossed portions 304*b*. The pressure distribution has a vertical amplitude (hereinafter referred to as a peak pressure ΔP) centered on each of the embossed portions 304*b*. As seen from FIGS. 4A and 4B, the pressure on the region where the embossed portions 304*b* are formed is high and the pressure on the region where the embossed portions 304*b* are not formed is low. As illustrated in FIG. 4B, if the distance d between the embossed portions 304*b* is twice as long as the distance d illustrated in FIG. 4A, the above-described peak pressure ΔP increases. If the peak pressure ΔP is larger than a predetermined pressure, then this causes uneven glossiness when the toner image T is fixed onto the recording material with the recording material being heated and pressed by the fixing nip portion N. In other words, the high-pressure portions illustrated in FIGS. 4A and 4B transfer the surface state of the mold release layer 301*c* better and thus tend to have higher glossiness. On the other hand, the low-pressure portions cannot transfer the surface state of the mold release layer 301*c* as well as the higher-pressure portions and thus tend to have lower glossiness. As such, the formation of the embossed portions 304*b* can cause uneven glossiness (defective image). As a result of verification, it can be estimated that the peak pressure ΔP [MPa] can be calculated based on the following verification expressions.

The verification was performed using a Hertz contact equation. Based on the Hertz contact equation, the following expressions are derived from the shape of each of the embossed portions 304*b* according to the present embodiment and the available distance d between the embossed portions 304*b*. The available distance d between the embossed portions 304*b* ranges from 0.2 mm to 2.5 mm.

A pressure applied to a unit area is calculated using the Hertz contact equation and considering the shape of each of the embossed portions 304*b* according to the present embodiment.

The pressure applied to the fixing nip portion N is referred to as a pressure F [N]. A contact area between the belt 301 and the embossed portions 304*b* is referred to as an area S [$mm^2$]. The area S is calculated from a contact area $a^2$ where the embossed portions 304*b* in an area $d^2$ contact the belt 301, the area $d^2$ that is an area obtained by multiplying the distance between the embossed portions 304*b* in the sheet width direction by the distance d between the embossed portions 304*b* in the conveyance direction, and an area Ns of the fixing nip portion N.

$$\Delta P = \frac{3}{2\pi} \times \frac{F}{S} \quad (3)$$

$$\Delta P = \frac{3}{2\pi} \times \frac{d^2}{a^2} \times \frac{F}{Ns}$$

The shape of each of the embossed portions 304*b* according to the present embodiment, the available distance d between the embossed portions 304*b*, and a contact width are taken into consideration. In this case, the following expression (4) is obtained by rearranging the above-described expression.

$$\Delta P = 0.\ 1 \times d^2 \times \frac{F}{Ns} \quad (4)$$

An average pressure P [MPa] on the fixing nip portion N is calculated by dividing the pressure F [N] on the fixing nip portion N by the area Ns [$mm^2$] of the fixing nip portion N. Thus, the following expression is obtained by rearranging the above-described expression.

$$\Delta P = 0.\ 1Pd^2 \text{ [MPa]} \quad (5)$$

As is obvious from Expression (5), the peak pressure ΔP is dependent on the distance d between the embossed portions 304*b* and the value of the average pressure P on the fixing nip portion N.

Next, the "height uneven pressure" will be described with reference to FIGS. 5A and 5B. FIG. 5A illustrates a schematic view of the fixing device f according to the present embodiment using the embossed portions 304*b*, and also illustrates a pressure distribution on the surface of the toner image T at the dotted-line portion. FIG. 5B illustrates a schematic view of the fixing device f when an embossed portion gap eg is generated in part of the embossed portions 304*b* of the sliding member 304, and also illustrates a pressure distribution on the surface of the toner image T at the dotted-line portion. If the embossed portions 304*b* have a uniform height, the pressure distribution on the surface of the recording material will be dependent on the embossed portions 304*b* of the sliding member 304 and has a constant peak pressure ΔP based on the embossed portions 304*b*. However, if the embossed portion gap eg is generated, the pressure on the portion where the embossed portion gap eg is generated decreases and the pressure on the embossed portions 304*b* that are adjacent to the portion where the embossed portion gap eg is generated increases. As a result, an uneven pressure deviation (ΔPeg) is generated on the surface of the toner image T. The uneven pressure deviation (ΔPeg) generated on the surface of the toner image T can cause uneven glossiness when the toner image T is fixed onto the recording material, with the recording material being heated and pressed by the fixing nip portion N. In other words, the portions where the uneven pressure deviation ΔPeg is high, as illustrated in FIG. 5B, can better transfer the surface state of the mold release layer 301*c* of the belt 301. Thus, these portions tend to have higher glossiness. The portions where the uneven pressure deviation ΔPeg is low cannot transfer the surface state of the mold release layer 301*c* of the belt 301 as well as the high-pressure portion, and thus these portions tend to have lower glossiness. As such, the generated embossed portion gap eg causes uneven glossiness (defective image). The embossed portion gap eg is generated due to an error in the individual embossed portions 304*b*. Thus, it is desirable to design the embossed portions 304*b* in consideration of the embossed portion gap eg. To prevent the generation of the uneven pressure deviation ΔPeg, the extent to which the belt 301 fits the embossed portions 304*b* of the sliding member 304 when the fixing nip portion N applies the pressure to the belt 301 is taken into consideration. If the embossed portion gap eg is generated and one of the embossed portions 304*b* has a lower height than the adjacent embossed portions 304*b*, the belt 301 better fits the lower embossed portions 304*b*, thereby preventing the generation of the uneven pressure deviation ΔPeg. In this case, the amount of the area of the belt 301 to be pressed into the embossed portion gap eg of the embossed portions 304*b* of the sliding member 304 is defined as a recessed amount h [mm]. As a result of numerical verification, it has been determined that the extent to which the belt 301 fits the embossed portion gap eg is dependent on the magnitude relationship between the embossed portion gap eg and the recessed amount h defined above.

To calculate the recessed amount h, a formula for a beam under a uniformly-distributed load with both ends supported and a formula for second moment of area are used. The calculation is performed assuming that the embossed portions 304*b* support both ends of the belt 301.

The following expression (6a) can be derived using the beam formula and the formula for second moment of area.

$$\delta \text{Max} = \frac{60Pd^4}{384Et^3} \tag{6a}$$

In the expression (6a), P represents the average pressure [MPa] on the fixing nip portion N, E represents the Young's modulus [MPa] of the belt 301, and t represents the thickness [mm] of the belt 301.

Assuming that δMax on the left side of the expression (6a) represents the recessed amount h [mm], the following expression (6b) is obtained by rearranging the right side of the expression (6a).

$$h = 0.156 \times \frac{P}{Et^3} d^4 \text{ [mm]} \tag{6b}$$

As the distance d between the embossed portions 304*b* decreases, the "apparent rigidity" of the belt 301 that is present between the embossed portions 304*b* of the sliding member 304 increases and thus the recessed amount h decreases. When the Young's modulus E of the belt 301 increases or the thickness t of the belt 301 increases, the belt 301 cannot fit the embossed portion gap eg appropriately, meaning that the recessed amount h decreases. When the average pressure on the fixing nip portion N increases, the force applied to the belt 301 increases and thus the recessed amount h decreases. The minimum allowable recessed amount h is determined based on the above-described expressions (that is, the recessed amount h is sufficiently larger than the embossed portion gap eg), thereby making it possible to determine the range of each value to prevent the height uneven pressure.

The results of analyzing the verification expression for the uneven peak and the verification expression for the height uneven pressure show that it is desirable to appropriately set the distance d between the embossed portions 304*b* depending on the average pressure P on the fixing nip portion N, the Young's modulus E of the belt 301, and the thickness t of the belt 301. It is desirable to prevent the uneven peak by reducing the peak pressure ΔP by reducing the distance d between the embossed portions 304*b*. On the other hand, it is desirable to prevent the height uneven pressure by increasing the recessed amount h by increasing the distance d between the embossed portions 304*b*. Thus, when the average pressure P on the fixing nip portion N, the Young's modulus E of the belt 301, and the thickness t of the belt 301 are determined, the available distance d between the embossed portions 304*b* is determined. An allowable upper limit of the peak pressure ΔP and an allowable lower limit of the recessed amount h are determined and verified as explained below.

<Method for Measuring Various Parameters>

A method for measuring various parameters (the Young's modulus E of the belt 301, the thickness t of the belt 301, the distance d between the embossed portions 304*b*, and the average pressure P on the fixing nip portion N) will be described with reference to FIGS. 6A to 6C and FIGS. 7A to 7C.

<Method for Measuring Young's Modulus E>

A method for measuring the Young's modulus E of the belt 301 will now be described. In measuring the Young's modulus E, a tensile tester AG-X manufactured by Shimadzu Corporation is used. A load cell for 500 N is used as an attachment for the tensile tester AG-X, and a mechanical parallel fastening chuck for 500 N is used as a chuck. In conducting a tensile test, the temperature in a temperature controlled chamber is set to 180 degrees Celsius and the tension speed is set to 5 mm/min. Results of thicknesses measured in advance are input. The value of the thickness of the base layer 301*a* of the belt 301 with the largest strength of the layers of the belt 301 is input as the measured thickness values used in the tensile test. The elastic modulus is calculated in the region where the testing force of the load cell ranges from 10 N to 15 N. This measurement is started after confirming that the set temperature in the temperature controlled chamber in the tensile test has reached 180 degrees Celsius. A dumbbell shape specified by the Japanese Industrial Standards (JIS) K7139-A24 is used in the tensile test. The measurement in the peripheral direction and the measurement in the longitudinal direction are each performed ten times, and by taking the average value of the measured values, the elastic modulus in the peripheral direction and the elastic modulus in the longitudinal direction are obtained. The average value between the modulus in the peripheral direction and the modulus in the longitudinal direction is used as the modulus of longitudinal elasticity E [MPa] of the belt 301 in this measurement. Assume that if the belt 301 includes various types of layers, like the belt 301 illustrated in FIG. 1, the various layers are treated as one layer and the above-described procedure is carried out on the one layer.

<Method for Measuring Thickness t>

Next, a method for measuring the thickness t of the belt 301 will be described. In measuring the thickness t, samples are created by dividing the area of the belt 301 in the Y-direction (sheet width direction) into quarters. The thickness t of the belt 301 is measured by a digital length measuring machine CT6001 manufactured by HEIDENHAIN. The temperature is set to 23 degrees Celsius and the humidity is set to 30% as measurement conditions. The thickness t of the belt 301 is measured in the X-direction (conveyance direction) on the samples obtained by dividing the area of the belt 301 into quarters, and then the average value of the measured thicknesses is calculated as the thickness t [mm] of the belt 301. In this measurement, if the belt 301 includes various types of layers, like the belt 301 illustrated in FIG. 1, the thickness of the base layer 301*a* is measured except for the elastic layer 301*b* and the mold release layer 301*c* of the belt 301. If the belt 301 includes another layer different from the elastic layer 301*b*, the mold release layer 301*c*, and the base layer 301*a*, the thickness of the other layer and the base layer 301*a* is defined as the thickness t of the belt 301, and the thickness t of the belt 301 is measured.

<Method for Measuring Distance d Between Embossed Portions>

A method for measuring the distance d between the embossed portions 304*b* of the sliding member 304 will now be described.

Figure 6A:
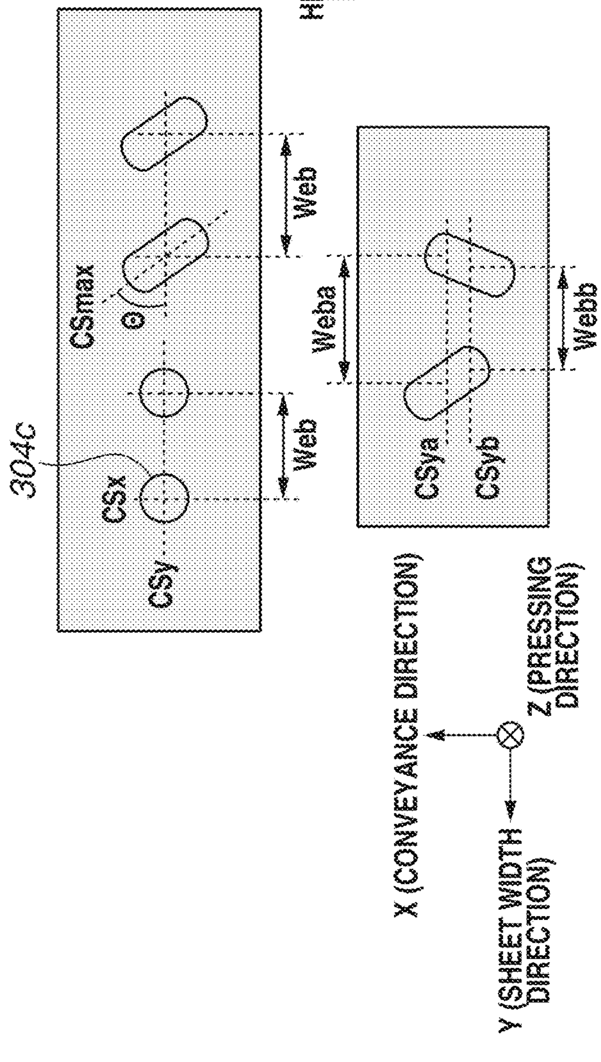
FIG. 6A is a schematic sectional diagrams illustrating embossed portions.
Figure 6B:
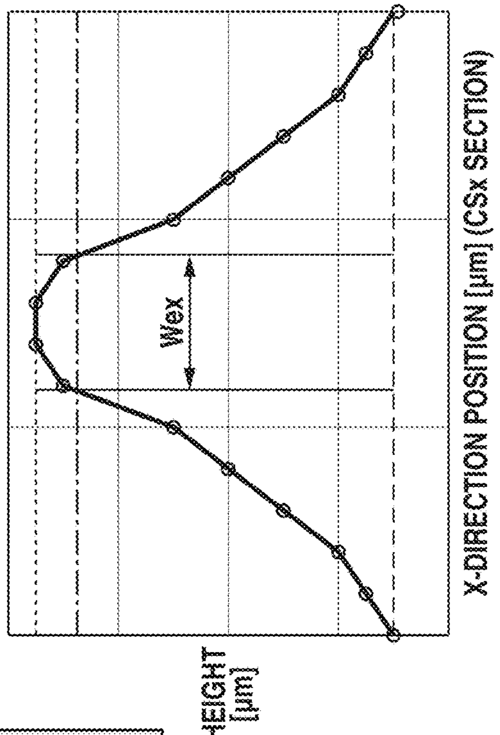
FIGS. 6B and 6C are schematic graphs each illustrating embossed portions.
Figure 6C:
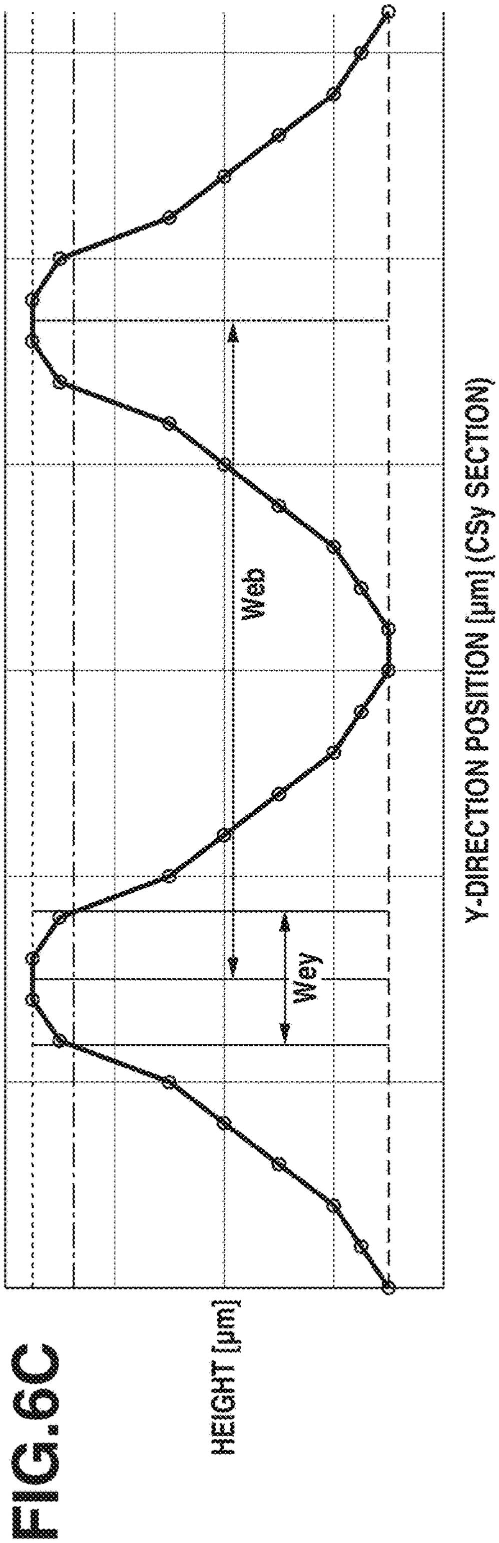

First, parameters used for the measurement will be described with reference to a schematic sectional view of FIG. 6A and schematic graphs of FIGS. 6B and 6C each illustrating the embossed portions 304*b* of the sliding member 304. FIG. 6A is a schematic view of the embossed portions 304*b* of the sliding member 304 illustrated in FIGS. 3A and 3B as viewed from the pressure roller 305 (in the Z-direction corresponding to the pressing direction). FIG. 6B is a schematic graph illustrating the embossed portions 304*b* when the vertex of the embossed portion 304*b* is taken along the X-direction (conveyance direction). FIG. 6C is a schematic graph illustrating two adjacent embossed portions 304*b* illustrated in FIGS. 3A and 3B when the vertex of each embossed portion 304*b* is taken along the Y-direction (sheet width direction). Referring to FIG. 6B, "Wex" represents the width in the X-direction of the portion, which is in contact with the belt 301, of the embossed portion 304*b* of the sliding member 304. Referring to FIG. 6C, "Wey" represents the width in the Y-direction of the portion, which is in contact with the belt 301, of the embossed portion 304*b* of the sliding member 304, and "Web" represents the width in the Y-direction as the distance between the vertices of the adjacent embossed portions 304*b* of the sliding member 304.

As a modified example of the present embodiment, the width "Wex" when the shape of the embossed portion 304*b* of the sliding member 304 is asymmetric with respect to the X-direction (conveyance direction) or the Y-direction (sheet width direction) is defined with reference to FIG. 6A. If the shape of the embossed portion 304*b* of the sliding member 304 is asymmetric with respect to an X-axis or a Y-axis, a CSmax axis at which the portion, which is in contact with the belt 301, of the embossed portion 304*b* of the sliding member 304 on the XY-plane is maximum is first determined, and a contact width Wmax at the CSmax axis is defined. Next, an angle Θ formed between the Y-axis and the CSmax axis, as illustrated in FIG. 6A, is estimated. Lastly, $Wex=Wmax\times\sin\Theta$ and $Wey=Wmax\times\cos\Theta$ are calculated to set the contact width on the CSmax axis in the projection as the measured value.

As a modified example, a distance Web between the vertices of the adjacent embossed portions 304*b* of the sliding member 304 when the shape of each embossed portion 304*b* of the sliding member 304 is asymmetric with respect to the X-direction (conveyance direction) or the Y-direction (sheet width direction) is defined with reference to FIG. 6A. First, a section CSya that passes through the vertex of one of the embossed portions 304*b* is created and a distance Weba between the vertices of the adjacent embossed portions 304*b* of the sliding member 304 is measured. Next, a Y-direction section CSyb that passes through the vertex of the neighbouring embossed portion 304*b* is created and a distance Webb between the vertices of the adjacent embossed portions 304*b* of the sliding member 304 is measured. "Web" represents the average value between the distance Weba and the distance Webb.

Next, a method for measuring the above-described parameters (Wex, Wey, Web) will be described.

The width Wex and the width Wey of the embossed portions 304*b* of the sliding member 304 that are in contact with the belt 301 are measured using a three-dimensional shape measuring machine VR-3200 manufactured by Keyence Corporation and pressure sensitive paper Prescale manufactured by FUJIFILM Holdings Corporation. Pressure sensitive paper Prescale for ultra-low pressure (LLW) manufactured by FUJIFILM Holdings Corporation is used depending on the measurement pressure range (2.5 MPa to 10 MPa). In the fixing device f illustrated in FIG. 2, the belt 301 is cut open in the longitudinal direction and the Prescale is disposed between the sliding member 304 and the belt 301 in the region of the fixing nip portion N and is pressed. After the applied pressure is removed, the contact region alone at the leading edge of each of the embossed portions 304*b* of the sliding member 304 turns red on the Prescale signaling that the contact region on the Prescale can be obtained. That is, after the pressing was two-dimensionally measured by the three-dimensional shape measuring machine VR-3200 manufactured by Keyence Corporation the contact region was obtained, and the width Wex and the width Wey of the contact region were calculated. In the measurement, a magnification of 40-fold was set. In order to obtain the width Wex, the section that passes through the center of the red region on the Prescale and is perpendicular to the X-direction (conveyance direction) was measured. In order to obtain the width Wey, the section that passes through the center of the red region on the Prescale and is perpendicular to the Y-direction (sheet width direction) was measured. At least 10 different portions on the embossed portions 304*b* of the sliding member 304 were measured and the average value of the measured values was obtained to calculate the width Wex and the width Wey of the contact region. Although not described in the present embodiment, if not all the embossed portions 304*b* of the sliding member 304 have the same shape, it is desirable to calculate the average value of the measured values including the measured values for the embossed portions 304*b* of the sliding member 304 with different shapes.

The distance Web between the vertices of the adjacent embossed portions 304*b* of the sliding member 304 was measured by the three-dimensional shape measuring machine VR-3200 manufactured by Keyence Corporation. In the measurement, the magnification of 40-fold or more may be desirably set. The measurement is made by setting the sliding member 304 on the machine in such a manner that the convex portion of each of the embossed portions 304*b* faces upward. After the measurement, a sectional profile was checked, where the distance between vertex positions in the Y-direction (sheet width direction) was measured on the section connecting highest point positions of the embossed portions 304*b* of the sliding member 304 in order to obtain the distance Web between the vertices.

A procedure for measuring the distance d between the embossed portions 304*b* will now be described with reference to FIGS. 7A to 7C in view of the above-described measurement method.

Figure 7A:
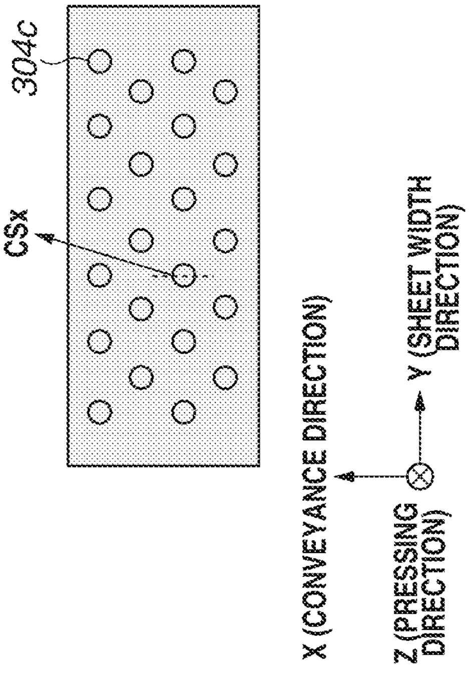
FIGS. 7A to 7C are schematic diagrams each illustrating a method for measuring distances between embossed portions.
Figure 7B:
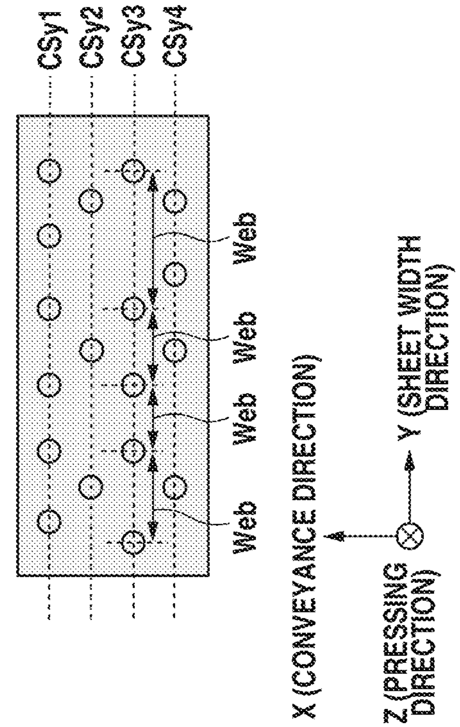
Figure 7C:
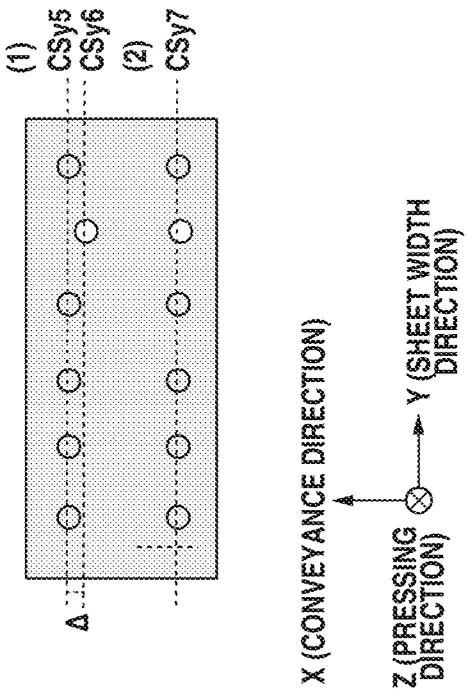

First, to estimate a measurement pitch (FIG. 7B) (distance between sections CSy) in the Y-direction (sheet width direction), the width Wex of the contact region in a CSx direction, as shown in FIG. 7A, is measured. The width Wex corresponds to the embossed portion 304*b* of the sliding member 304 which is in contact with the belt 301. This is done in the manner as described in the abovementioned procedure. Next, the distance Web on the horizontal section in the Y-direction (sheet width direction) is measured. As indicated by a dotted line CSy3 illustrated in FIG. 7B, the profile is measured such that the dotted line CSy3 passes through the end portions of the embossed portions 304*b* of the sliding member 304. Based on the profile measurement result, the distance Web between the adjacent embossed portions 304*b* of the sliding member 304 is calculated (the measurement is performed on four points in FIG. 7B). The measured values of the distance Web are averaged by the number of measurement points. For example, the measurement value on the section indicated by the dotted line CSy3 is recorded as Weba3. The same operation is also performed on the measurement points indicated by a dotted line CSy1, a dotted line CSy2, and a dotted line CSy4, respectively, thereby obtaining the distances Weba (i.e., Weba1, Weba2, and Weba4) on the sections, respectively. Lastly, the average value of the distances Weba1 to Weba4 is calculated to thereby obtain the distance d between the embossed portions 304*b*. To perform the calculation to obtain the distance Weba, it is desirable to take one or more and ten or less distances Web on each section CSy. While FIG. 7B illustrates an example where the four measurement sections CSy1 to Cy4 are set, it is desirable to obtain the average value by performing the measurement on five or more measurement sections CSy.

As a supplementary description, a method for creating each section indicated by the dotted line CSy in the calculation of the distance d between the embossed portions 304*b* will be described. For convenience of description, FIG. 7C illustrates a case (1) where some of the embossed portions 304*b* of the sliding member 304 alone are deviated, and a case (2) where some of the embossed portions 304*b* of the sliding member 304 alone are not deviated. In relation to case (1) when a section CSy5 and a section CSy6 are created by focusing the embossed portions 304*b* indicated by open circles, as illustrated in FIG. 7C, the treatment of section CSy5 and section CSy6 is determined based on the magnitude of an X-direction pitch distance A (see FIG. 7C) between the section CSy5 and the section CSy6. For example, if the X-direction pitch distance A is larger than the contact width Wex in the CSx direction, calculated as described above, then the section CSy5 and the section CSy6 indicated by two dotted lines, respectively, are treated as separate sections and the calculation is performed on each of the sections. On the other hand, if the X-direction pitch distance A is smaller than the contact width Wex in the CSx direction, calculated as described above, then the section CSy5 and the section CSy6 indicated by the two dotted lines, respectively, are treated as the same section and the calculation is performed on a single section CSy7 (case 2).

The shapes of the embossed portions 304*b* of the sliding member 304 treated in the present embodiment were studied under conditions in which the width Wey of the contact region of the belt 301 is sufficiently smaller than the distance d between the embossed portions 304*b*. The sliding member 304 was created by changing the distance d between the embossed portions 304*b* in the range from 0.2 mm to 2.5 mm, and the distance d between the embossed portions 304*b* and the width Wey of the contact region of the belt 301 were measured. The distance d between the embossed portions 304*b* and the width Wey of the contact region of the belt 301 were measured in the same manner as described above. As a result of the measurements, it was determined that the measurement values are twice the average value Weva of the widths Wey of the contact region of the belt 301 for the distances d between the embossed portions 304*b* in the range from 0.2 mm to 2.5 mm. Thus, the shapes of the embossed portions 304*b* of the sliding member 304 according to the present embodiment in the range where the measurements are twice the average value Weva of the widths Wey of the contact region of the belt 301 were studied. In other words, in the present embodiment, the average value of the widths Wey of the contact region between the belt 301 and the sliding member 304 in the sheet width direction on the surface where the sliding member 304 is in contact with the belt 301 is smaller than the average value of the widths of non-contact regions. This means that the width of the contact region between the belt 301 and the sliding member 304 is reduced in this configuration. This allows the friction between the belt 301 and the sliding member 304 to be reduced, preventing the wear due to friction.

The distance d between the embossed portions 304*b* is measured as described above. The average of the distances between the ends of the embossed portions 304*b* is calculated as the distance d between the embossed portions 304*b*. The end of each of the embossed portions 304*b* is a portion that most protrudes toward the pressure roller 305 in the embossed portions 304*b*. Thus, the end of one embossed portion 304*b* is a region with a highest pressure, and the distance between the ends is used to calculate the distance d between the embossed portion 304*b*.

<Method for Measuring Average Pressure P of Fixing Nip Portion>

A method for measuring a load value NF on the fixing nip portion N and a method for calculating the average pressure P on the fixing nip portion N will now be described. The average pressure P on the fixing nip portion N was obtained by measuring and calculating the load value NF and the nip area S. The load value NF was measured by a pressure measurement device I-SCAN manufactured by NITTA Corporation. A sheet portion of the pressure measurement device I-SCAN was inserted into the fixing nip portion N of the fixing device f and a load was applied to the fixing nip portion N, and then the load value NF was measured using dedicated software. The nip area S was measured by measuring the nip width and a width L in the nip sheet feed direction using pressure sensitive paper "Prescale" manufactured by FUJIFILM Holdings Corporation. As the pressure sensitive paper "Prescale" manufactured by FUJIFILM Holdings Corporation, a Prescale (4LW) for fine pressure was used depending on the measurement pressure range (0.05 MPa to 0.2 MPa). The Prescale was disposed between the belt 301 and the pressure roller 305 on the region of the fixing nip portion N in the fixing device f illustrated in FIG. 2 and was pressed. When the applied pressure was removed and the Prescale was observed, the region of the fixing nip portion N alone turned red. The contact region of the Prescale was obtained after the pressing was equally measured at about ten points in the X-direction (conveyance direction) with a ruler and the average value of the measured values was calculated as a nip width Nx. Similarly, the contact region of the Prescale was obtained after the pressing was equally measured at about five points in the Y-direction (sheet width direction) with a ruler and the average value of the measured values was calculated as a nip width Ny. Based on the measurement results, the nip portion average pressure (P) was calculated as NF/S, that is, NF/(Nx×Ny).

<Image Checking and Verification Method>

An evaluation method for determining whether a defective image is present on the image forming apparatus 1 illustrated in FIG. 1 will now be described. In the verification, the fixing device f in which the parameters (d, E, t, P) were set was attached. A method for changing the parameters will be described below. The circumferential speed of the pressure roller 305 mounted on the fixing device f was set to 250 mm/sec, and the temperature of the heating roller 307 was controlled at 195 degrees Celsius. In this case, the surface of the belt 301 was monitored by an infrared radiometer IT-340 manufactured by Horiba, Ltd., and it was observed that the surface temperature of the belt 301 was 180 degrees Celsius. A study was conducted to determine whether a defective image was present on an output black sample An A4-size OHT film VF-1420N manufactured by KOKUYO CO., LTD. was used as a sheet to facilitate checking of a defective image. To facilitate checking of a defective image due to uneven pressure, a sample entirely colored in black with high density was printed. If an uneven glossiness or uneven density horizontally extending in the conveyance direction was observed on the supplied sample, it was determined that a defective image was generated. If an uneven glossiness or uneven density was generated in a comb-like pattern on the entire surface of the supplied sample, it was determined that a defective image was generated due to emboss peak uneven pressure. If the uneven glossiness or uneven density was generated unevenly on the supplied sample, it was determined that a defective image was generated due to the emboss height uneven pressure.

<Verification Procedure and Verification Results>

The verification procedure and results of verifications performed by changing the distance d between the embossed portions 304*b* of the sliding member 304 according to the present embodiment will now be described below.

A verification processing flow will be described based on the procedure from verification 1 to verification 3. First, various parameters (the nip width Nx in the conveyance direction, the nip width Ny in the sheet width direction, the load value NF, the average pressure P on the fixing nip portion N, the Young's modulus E of the belt 301, and the thickness t of the belt 301) for the fixing device f are set and prepared. Next, the sliding member 304 according to the present embodiment is attached to perform image checking and verification and determine the verification result. In the above-described procedure, the image checking and verification were repeatedly performed by replacing the sliding members 304 with different distances d (d=0.2 mm, 0.9 mm, 1.8 mm, 2.1 mm, and 2.5 mm) between the embossed portions 304*b* of the sliding member 304. Lastly, the values calculated based on various parameters and the image checking and verification results are summarized in tables and graphs on the distance d between the embossed portions 304*b*. The verification processing was performed by setting the parameters other than the distance d between the embossed portions 304*b* in the manner as described above unless otherwise noted.

FIGS. 8A and 8B, FIGS. 9A and 9B, and FIGS. 10A and 10B are graphs illustrating the results of verification 1, verification 2, and verification 3, respectively. FIG. 11 illustrates the results of evaluating the peak pressure ΔP on the embossed portions 304*b* of the sliding member 304 and the recessed amount h as a calculation result. FIG. 11 also illustrates the image evaluation results when the parameters used for the verifications 1 to 3 and the distance d between the embossed portions 304*b* are changed. The solid line graphs of FIGS. 8A to 10B were created based on the tables illustrated in FIG. 11. In each graph, "○" plotted on the graph indicates that the image evaluation result shows that no defective image is generated, and "x" plotted on the graph indicates that the image evaluation result shows that a defective image is generated.

<Verification 1>

Figure 8A:
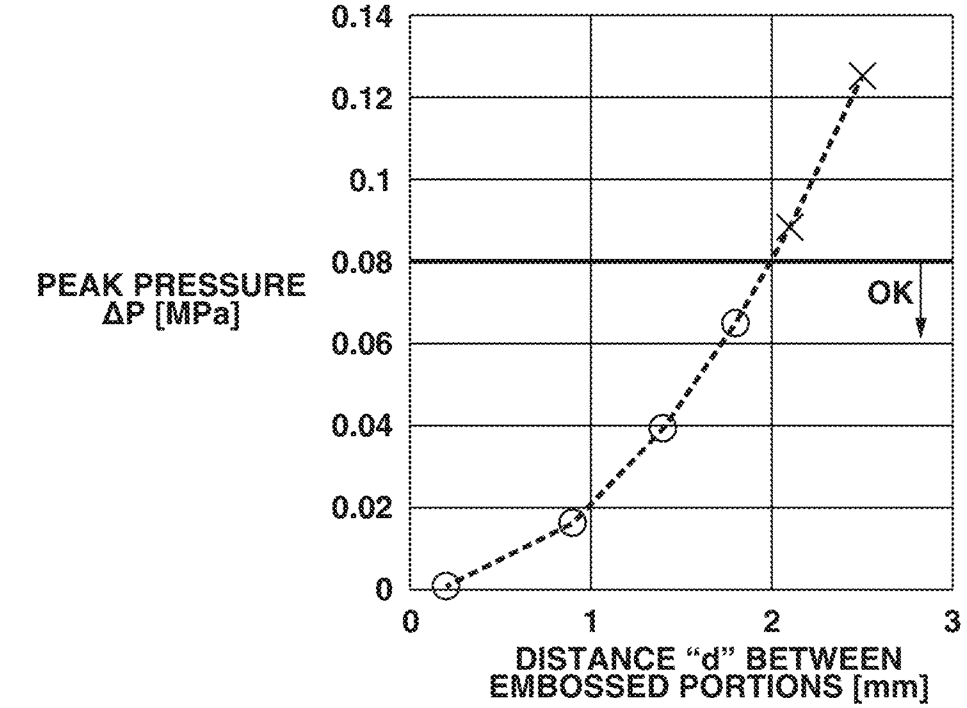
FIGS. 8A and 8B are graphs illustrating results of verification 1.
Figure 8B:
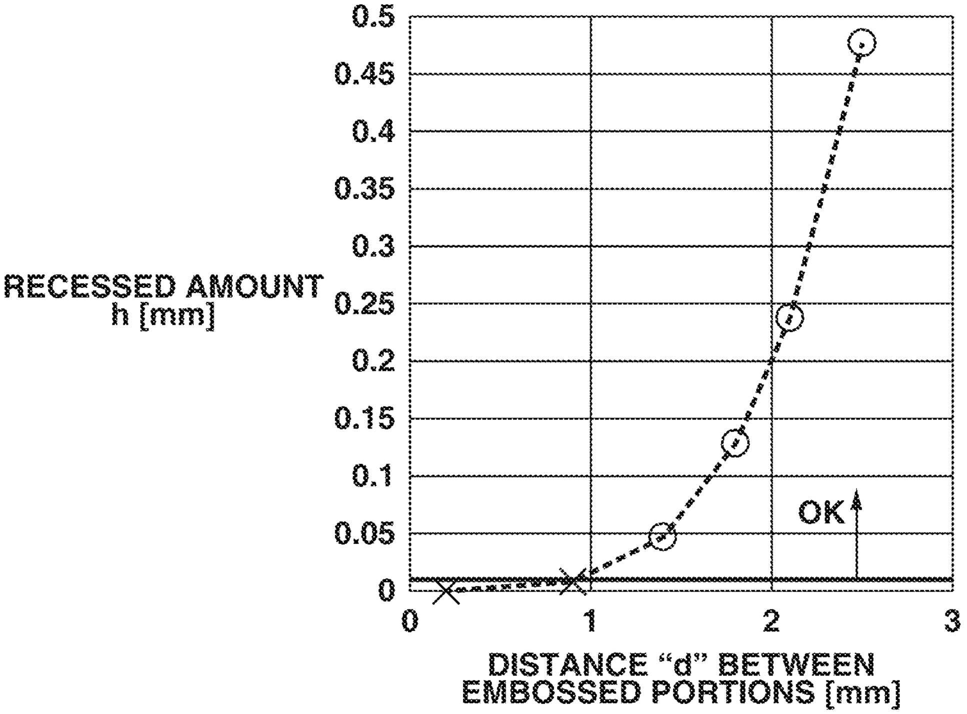

First, various parameters were verified under the conditions (same conditions as those in the embodiment) illustrated in FIG. 11, and the upper limit of the peak pressure ΔP of the embossed portions 304*b* of the sliding member 304 and the lower limit of the recessed amount h as calculation results were obtained based on a defective image generation threshold. Polyimide was used as the base layer material of the belt 301 and it was confirmed that E=5000 MPa and t=0.08 mm. FIGS. 8A and 8B are graphs each illustrating the verification result. FIG. 8A illustrates a relationship between the peak pressure ΔP and the distance d between the embossed portions 304*b*, and FIG. 8B illustrates a relationship between the recessed amount h and the distance d between the embossed portions 304*b*. As illustrated in the graph of FIG. 8A, when the peak pressure ΔP on the embossed portions 304*b* of the sliding member 304 was more than or equal to a certain value, a defective image was generated due to the emboss peak uneven pressure. The verification result shows that the upper limit of the peak pressure ΔP at which a defect image was not generated due to the emboss peak uneven pressure was 0.08 MPa (value indicated by a solid line in the graph). As illustrated in the graph of FIG. 8B, when the recessed amount h of the embossed portions 304*b* of the sliding member was less than or equal to a certain value, a defective image was generated due to the emboss peak uneven pressure. The verification result shows that the lower limit of the recessed amount h at which a defective image was not generated due to the emboss peak uneven pressure was 0.01 mm (value indicated by a solid line in FIG. 8B). The graphs of FIGS. 8A and 8B and the tables illustrated in FIG. 11 show that the generation of a defective image can be prevented by setting the distance d between the embossed portions 304*b* within a predetermined range. The result of verification 1 shows that the range in which the generation of a defective image (due to emboss peak uneven pressure) is prevented can be represented by the following expressions (7) and (8).

$$0.1\,Pd^2 \leq 0.08\ [\text{MPa}] \tag{7}$$

$$0.01 \leqq 0.156 \times \frac{P}{Et^3} d^4\ [\text{mm}] \tag{8}$$

<Verification 2>

Figure 9A:
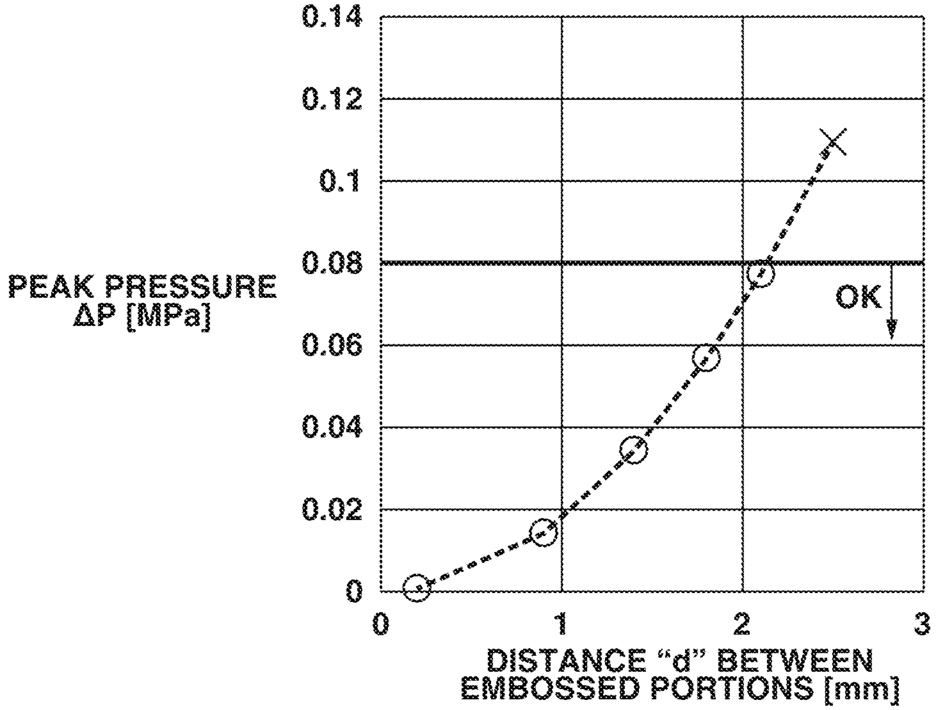
FIGS. 9A and 9B are graphs illustrating results of verification 2.
Figure 9B:
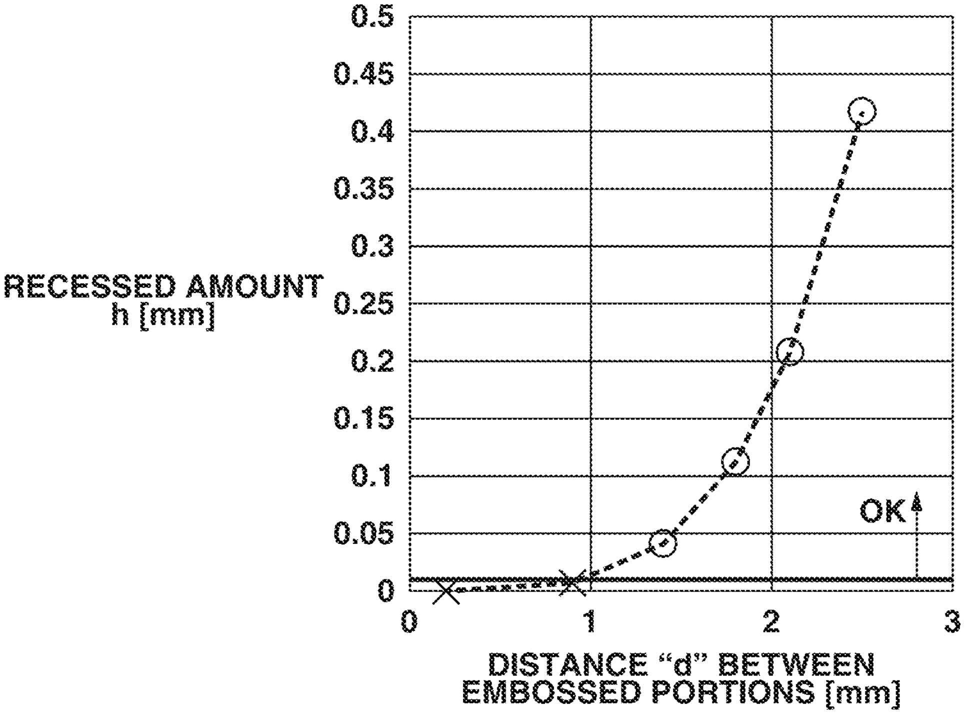

Next, various parameters were verified under the conditions illustrated in FIG. 11 to verify the validity of the two expressions (7) and (8) described above, and the defective image generation threshold was observed. The various parameters were studied by changing the load value NF to 1400 N by changing the Young's modulus of the elastic layer 305*b* of the pressure roller 305. FIGS. 9A and 9B are graphs each illustrating the verification results.

FIG. 9A illustrates a relationship between the peak pressure ΔP and the distance d between the embossed portions 304*b*, and FIG. 9B illustrates a relationship between the recessed amount h and the distance d between the embossed portions 304*b*. As seen from FIG. 9A, it can be determined whether a defective image generated due to the emboss peak uneven pressure is present based on a peak pressure threshold of 0.08 MPa (indicated by a solid line in FIG. 9A). As seen from FIG. 9B, it can be determined whether a defective image generated due to the emboss peak uneven pressure is present based on a recessed amount threshold of 0.01 (value indicated by a solid line in FIG. 9B). The above-described results show that the two expressions (7) and (8) described above are also satisfied when the average pressure P on the fixing nip portion N is changed by changing the load value NF.

The two expressions (7) and (8) described above are also satisfied when the load value NF is changed to a value other than 1600 N and 1400 N.

<Verification 3>

Figure 10A:
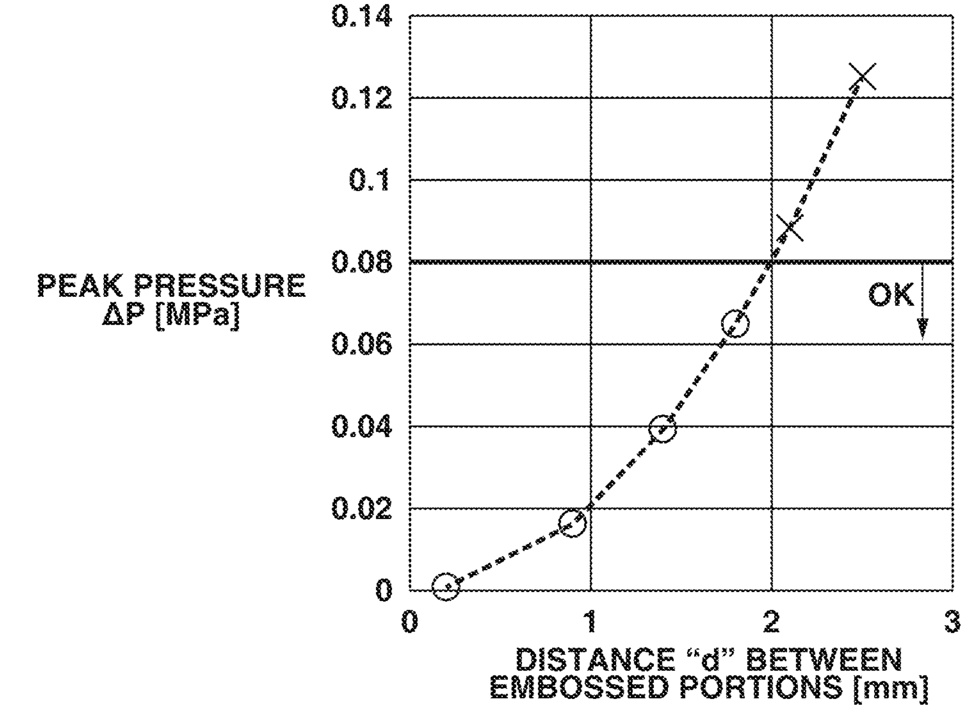
FIGS. 10A and 10B are graphs illustrating results of verification 3.
Figure 10B:
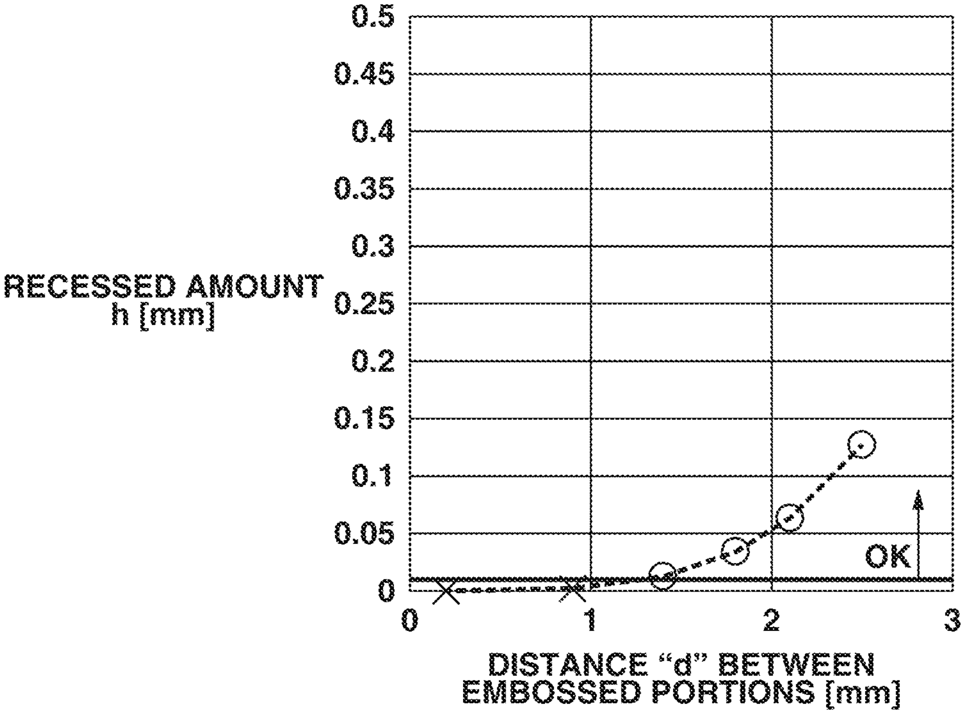

Lastly, various parameters were verified under the conditions illustrated in FIG. 11 to verify the validity of the two expressions (7) and (8) described above, and the defective image (due to emboss peak uneven pressure) generation threshold was observed. The various parameters were verified under the conditions with E=150000 MPa and t=0.04 mm by changing the physical properties of the base layer 301*a* of the belt 301 to a nickel material. FIGS. 10A and 10B are graphs each illustrating the verification results. FIG. 10A illustrates a relationship between the peak pressure ΔP and the distance d between the embossed portions 304*b*, and FIG. 10B illustrates a relationship between the recessed amount h and the distance d between the embossed portions 304*b*. As seen from FIG. 10A, it can be determined whether a defect image generated due to the emboss peak uneven pressure is present based on a peak pressure threshold of 0.08 MPa (value indicated by a solid line in FIG. 9A). As seen from FIG. 10B, it can be determined whether a defective image generated due to the emboss peak uneven pressure is present based on the recessed amount threshold of 0.01 (value indicated by a solid line in FIG. 9B). The above-descried results show that the two expressions (7) and (8) described above are also satisfied when the belt Young's modulus E and the thickness t of the belt 301 are changed by changing the base layer 301*a* of the belt 301.

The two expressions (7) and (8) described above are also satisfied when the Young's modulus E of the belt 301 is changed to a value other than 5000 MPa and 150000 MPa. The two expressions (7) and (8) are also satisfied when the Young's modulus E of the belt 301 is set in the following range: 5000-150000 MPa. The two expressions (7) and (8) described above are also satisfied when the thickness t of the belt 301 is changed to a value other than 0.08 mm and 0.04 mm.

<Advantageous Effects when Expression (7) is Satisfied>

Expression (7) indicates that the peak pressure ΔP is less than or equal to a certain value. The distance d between the embossed portions 304*b* is set to a smaller value to satisfy Expression (7), so that the distance d between the embossed portions 304*b* decreases. Assuming that the pressure applied to the fixing nip portion N is constant, the pressure applied to a single embossed portion 304*b* decreases, which in turn means that the value of the peak pressure ΔP decreases. Consequently, the uneven glossiness on the surface of an image can be prevented.

<Advantageous Effects when Expression (8) is Satisfied>

Expression (8) indicates the recessed amount h of the belt 301 in the range in which the uneven glossiness can be prevented. The formation of the plurality of embossed portions 304*b* in the fixing nip portion N causes a difference in the height between the embossed portions 304*b*. When the distance d between the embossed portions 304*b* is set to a larger value to satisfy Expression (8), the distance between the embossed portions 304*b* increases. As the distance d between the embossed portions 304*b* increases, the recessed amount h increases. Thus, the belt 301 can fit the embossed portions 304*b* depending on the difference in the height between the embossed portions 304*b*. In other words, the belt 301 can fit the lower embossed portions 304*b*, so that the pressure applied to both of the embossed portions 304*b* adjacent to the lower embossed portions 304*b* can be reduced. Consequently, the uneven glossiness on the surface of an image can be prevented.

<Advantageous Effects when Expressions (7) and (8) are Satisfied>

The upper limit of the distance d between the embossed portions 304*b* can be set using Expression (7). The use of Expression (8) makes it possible to set the lower limit of the distance d between the embossed portions 304*b*. The distance d between the embossed portions 304*b* is set within the range in which the Expressions (7) and (8) are satisfied, thereby preventing an increase in the peak pressure ΔP and preventing the generation of uneven glossiness.

In the present embodiment, the distance d between the embossed portions 304*b* in the sheet width direction (Y-direction) is 1.4 mm, and the embossed portions 304*b* are arranged at regular intervals. The arrangement of the embossed portions 304*b* at regular intervals makes it possible to prevent an increase in the difference of the pressure applied on the embossed portions 304*b* in the same column in the sheet width direction within the fixing nip portion N. The case where some of the embossed portions 304*b* arranged at regular intervals are deviated due to an error caused due to the manufacturing process or other causes is included in examples of the case where the embossed portions 304*b* are arranged at regular intervals.

In addition, if a certain column of protrusions 304*b* is set as a reference in the sheet width direction as illustrated in FIG. 7A, the embossed portions 304*b* in an adjacent column in the conveyance direction are shifted in the sheet width direction and are arranged at regular intervals. As a result, the uneven pressure in the sheet width direction in the fixing nip portion N can be reduced as compared with the case where the embossed portions 304*b* are not shifted in the sheet width direction.

<Advantageous Effects when Metal is Used for Sliding Member>

In the present embodiment, the base material portion 304*a* of the sliding member 304 and the embossed portions 304*b* are integrally formed of SUS, which is metal. The sliding member 304 and the pressure roller 305 form the fixing nip portion N. In the present embodiment, the pressure applied to the fixing nip portion N is 1600 N and the width of the fixing nip portion N in the X-direction (conveyance direction) is 24.5 mm. The belt 301 and the sliding member 304 slide on each other while a large pressure is applied to the belt 301 and the sliding member 304. If the sliding member 304 that forms the fixing nip portion N is not highly durable, the member forming the fixing nip portion N can be deformed, forming wrinkles on the surface of paper. Thus, a highly durable pad can be achieved by using metal with high durability and high heat resistance (SUS is used in the present embodiment) as the sliding member 304.

In the present embodiment, the embossed portions 304*b* in contact with the belt 301 have a circular shape. However, the shape of the embossed portions 304*b* is not limited to a circular shape. The shape of the embossed portions 304*b* can have a shape other than a circular shape as long as the expression into which the area of the embossed portions 304*b* is substituted can be satisfied. For example, if the embossed portions 304*b* have a rectangular shape, the distance d between the embossed portions 304*b* corresponds to a distance between the centroids of rectangles. The shape of the embossed portions 304*b* is not limited to a circular shape as long as the expression into which the calculated area in contact with the belt 301 is substituted can be satisfied.

What is claimed is:

1. A fixing device comprising:

an endless fixing belt configured to heat a recording material;

a pressure member configured to press the fixing belt; and a sliding member configured to be in sliding contact with an inner peripheral surface of the fixing belt and being opposed to the pressure member, wherein the pressure member and the fixing belt form a fixing nip portion, and heat and pressure are applied to the recording material at the fixing nip portion to fix a toner image onto the recording material, wherein the sliding member includes a plurality of protrusions on a surface of the sliding member that is in sliding contact with the inner peripheral surface of the fixing belt, and wherein the following expressions are satisfied:

$$3/2\pi \times d^2/a^2 \times P \leq 0.08 \text{ [MPa]} \quad (1)$$

-continued $$1 \leq 15.6 \times \frac{Pd^4}{Et^3} \text{ [mm]} \tag{2}$$

where P [MPa] represents a pressure on the fixing nip portion, E [MPa] represents a Young's modulus of the fixing belt, t [mm] represents a thickness of the fixing belt, d [mm] represents a distance between the plurality of protrusions in a sheet width direction of the recording material, and $a^2$ [$mm^2$] represents an area where the plurality of protrusions in the area $d^2$ contact the fixing belt.

2. The fixing device according to claim 1, wherein the sliding member includes a base material portion provided with the plurality of protrusions, and the base material portion and the plurality of protrusions are integrally formed of metal.

3. The fixing device according to claim 1, wherein, in the sheet width direction, the distance between the plurality of protrusions corresponds to a distance between ends of adjacent protrusions.

4. The fixing device according to claim 1, wherein the sliding member includes a sliding layer and the sliding layer covers at least the plurality of protrusions.

5. The fixing device according to claim 1, wherein, in the sheet width direction in the fixing nip portion, a width of an area of the sliding member that is in contact with the fixing belt is smaller than a width of an area of the sliding member that is out of contact with the fixing belt.

6. The fixing device according to claim 1, wherein, the plurality of protrusions are located at regular intervals in the sheet width direction.

7. The fixing device according to claim 1, wherein the distance between the plurality of protrusions is a value calculated by averaging a plurality of distances between the plurality of protrusions.

8. The fixing device according to claim 1, wherein the Young's modulus of the fixing belt is set in the following range: 5000-150000 MPa.

* * * * *